US012596196B2

(12) United States Patent
Saurav et al.

(10) Patent No.: US 12,596,196 B2
(45) Date of Patent: Apr. 7, 2026

(54) SYSTEMS AND METHODS FOR CALIBRATING VEHICLE FOLLOWING DISTANCE DETERMINATION

(71) Applicant: Geotab Inc., Oakville (CA)

(72) Inventors: Shashank Saurav, Toronto (CA); Javed Siddique, York (CA); Mohammed Sohail Siddique, Milton (CA); Tuhin Tiwari, Kitchener (CA); Donghao Qiao, Milton (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/307,170

(22) Filed: Aug. 22, 2025

(65) Prior Publication Data

US 2026/0073558 A1     Mar. 12, 2026

Related U.S. Application Data

(60) Provisional application No. 63/691,391, filed on Sep. 6, 2024.

(51) Int. Cl.
| | |
|---|---|
| *G06V 10/25* | (2022.01) |
| *G01S 7/497* | (2006.01) |
| *G01S 17/86* | (2020.01) |
| *G01S 17/89* | (2020.01) |
| *G01S 17/931* | (2020.01) |

(Continued)

(52) U.S. Cl.
CPC ............... *G06T 7/74* (2017.01); *G01S 7/497* (2013.01); *G01S 17/86* (2020.01); *G01S 17/89* (2013.01); *G01S 17/931* (2020.01); *G06V 10/25* (2022.01); *G06V 20/58* (2022.01); *G06V 20/588* (2022.01); *G06T 2207/10028*

(2013.01); *G06T 2207/30256* (2013.01); *G06T 2207/30261* (2013.01); *G06V 2201/08* (2022.01)

(58) Field of Classification Search
CPC ............. G06T 7/74; G06T 2207/10028; G06T 2207/30256; G06T 2207/3026; G01S 17/931; G01S 17/86; G01S 7/497; G01S 17/89; G06V 10/25; G06V 20/58; G06V 20/588; G06V 2201/08
See application file for complete search history.

(56) References Cited

U.S. PATENT DOCUMENTS

| | | | | |
|---|---|---|---|---|
| 11,449,067 B1 * | 9/2022 | Allais | ................. | B60W 60/001 |
| 11,474,203 B2 * | 10/2022 | Kumar | ................. | G01S 7/4808 |

(Continued)

OTHER PUBLICATIONS

ISR/Written Opinion for PCT Application No. PCT/CA2025/051086 mailed Oct. 21, 2025, 7 pages.

(Continued)

*Primary Examiner* — Gregory M Desire
(74) *Attorney, Agent, or Firm* — Mark Pringle-Rigby

(57) ABSTRACT

Systems and methods for validating following distance detection models are discussed. A LIDAR unit and an image capture device are installed at a vehicle. LIDAR data from the LIDAR unit is used to identify a lead vehicle and for determination of a true following distance to the lead vehicle. An image-based following distance detection model is applied on image data captured by the image capture device. Following distance as determined by the image-based following distance model is compared to the true distance from the LIDAR data, to assess validity of the image-based following distance model.

15 Claims, 8 Drawing Sheets

(51) Int. Cl.
|  |  |
|---|---|
| *G06T 7/73* | (2017.01) |
| *G06V 20/56* | (2022.01) |
| *G06V 20/58* | (2022.01) |

(56) References Cited

U.S. PATENT DOCUMENTS

| | | | |
|---|---|---|---|
| 11,940,804 B2 * | 3/2024 | Liu | G05D 1/0274 |
| 11,989,949 B1 | 5/2024 | Mazumder et al. | |
| 12,266,190 B2 * | 4/2025 | Zhao | G06V 10/806 |
| 12,372,651 B2 * | 7/2025 | Donderici | G01S 17/89 |
| 12,411,247 B2 * | 9/2025 | Terefe | G01S 17/89 |
| 12,449,818 B2 * | 10/2025 | Ikeda | G05D 1/6987 |
| 2019/0293782 A1 | 9/2019 | Suryanaryana et al. | |
| 2022/0128701 A1 | 4/2022 | Alghanem et al. | |
| 2024/0153102 A1 * | 5/2024 | Chun | G06V 10/255 |

OTHER PUBLICATIONS

Kumar, G. A. et al. "LiDAR and Camera Fusion Approach for Object Distance Estimation in Self-Driving Vehicles." Symmetry, Feb. 24, 2020, vol. 12, Issue 2, pp. 123. Online. Retrieved on Oct. 10, 2025. Retrieved from: https://www.mdpi.com/2073-8994/12/2/324 Entire Document.

* cited by examiner

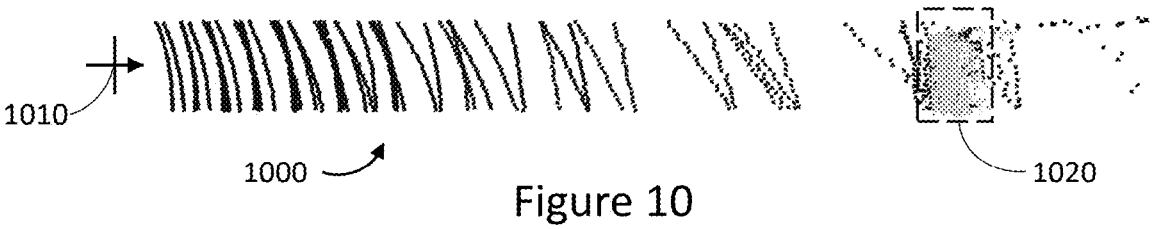
1010
1000
Figure 10
1020
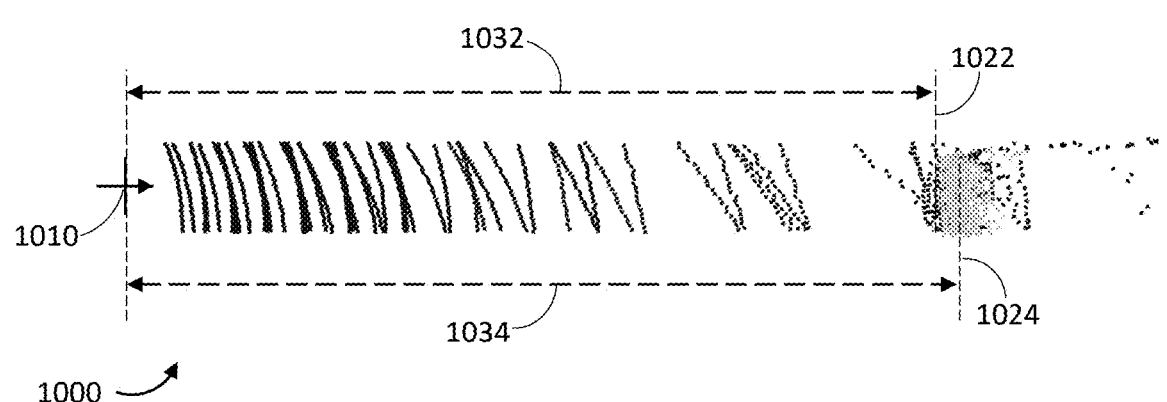
1032
1022
1010
1034
1024
1000
Figure 11
1202 | Alert: validation of image frame is false!
1204 | Success! Image frame is true!
Figure 12

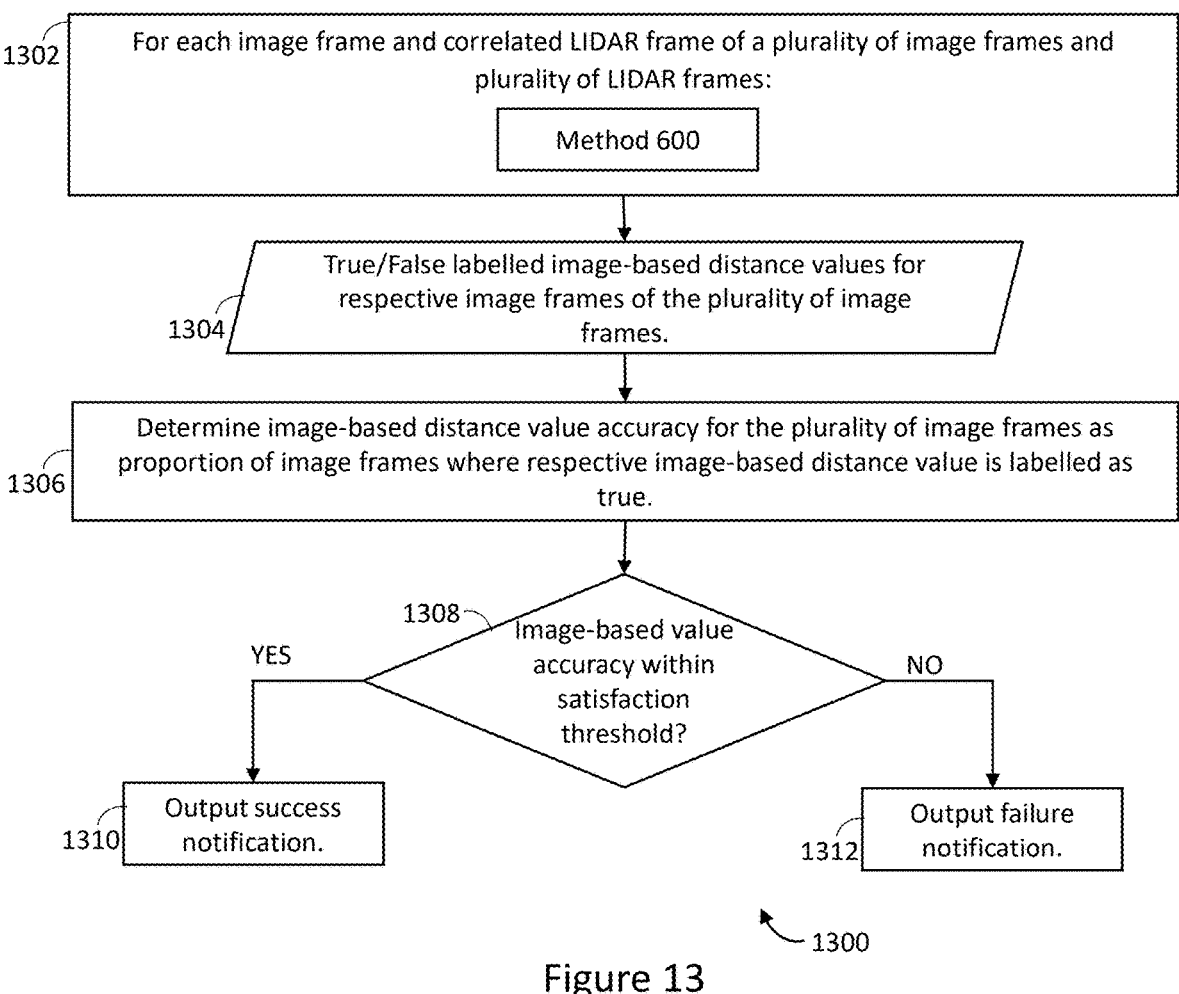

1302  For each image frame and correlated LIDAR frame of a plurality of image frames and plurality of LIDAR frames:

Method 600

1304  True/False labelled image-based distance values for respective image frames of the plurality of image frames.

1306  Determine image-based distance value accuracy for the plurality of image frames as proportion of image frames where respective image-based distance value is labelled as true.

1308  Image-based value accuracy within satisfaction threshold?

YES

NO

1310  Output success notification.

1312  Output failure notification.

1402  Alert: Following distance detection model has failed accuracy tests.

1404  Success! Following distance detection model has passed accuracy tests!

Figure 14

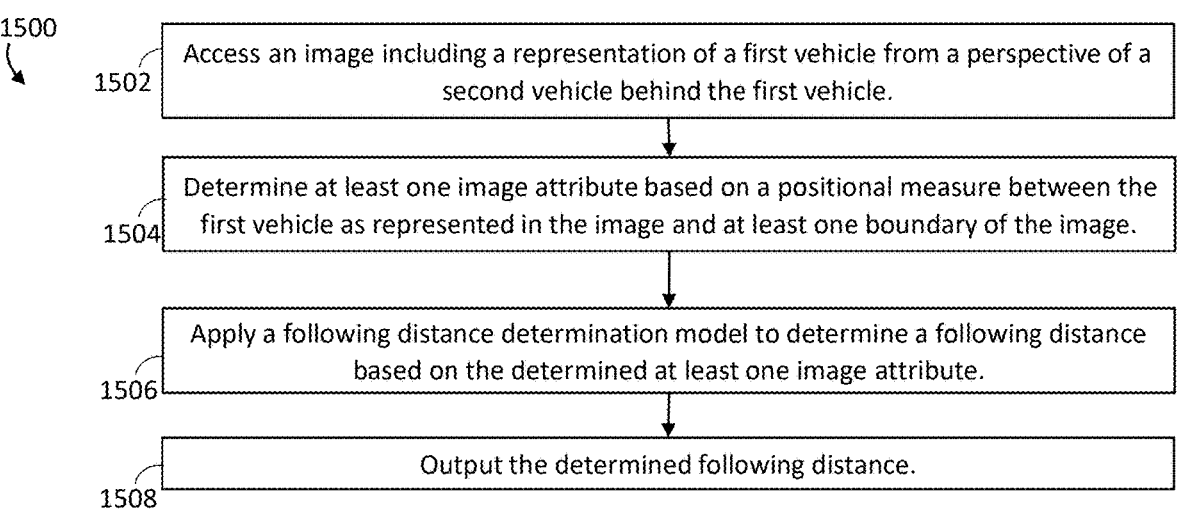

1500

1502 — Access an image including a representation of a first vehicle from a perspective of a second vehicle behind the first vehicle.

1504 — Determine at least one image attribute based on a positional measure between the first vehicle as represented in the image and at least one boundary of the image.

1506 — Apply a following distance determination model to determine a following distance based on the determined at least one image attribute.

1508 — Output the determined following distance.

Figure 15

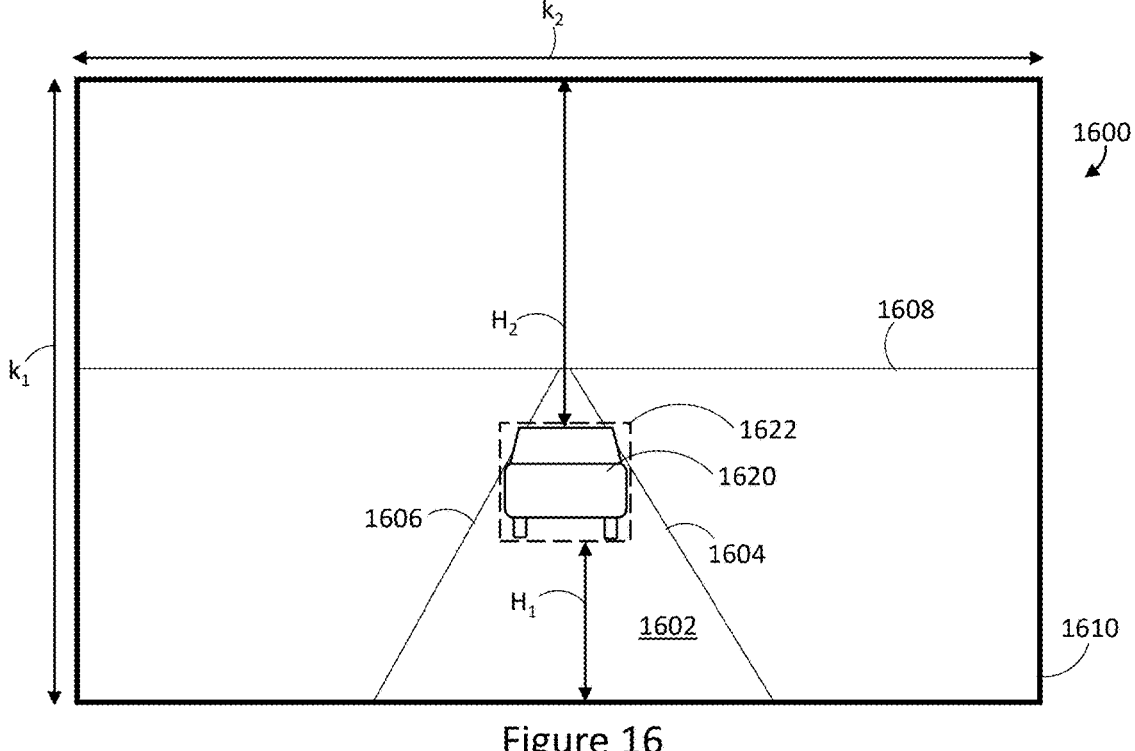

Figure 16

SYSTEMS AND METHODS FOR CALIBRATING VEHICLE FOLLOWING DISTANCE DETERMINATION

PRIOR APPLICATION DATA

This application claims priority to U.S. Provisional Patent Application No. 63/691,391, titled "Systems and Methods for Calibrating Vehicle Following Distance Determination", filed on Sep. 6, 2024.

TECHNICAL FIELD

The present disclosure generally relates to systems and methods for improving accuracy of vehicle following distance, and in particular relate to calibrating and validating following distance detection equipment and algorithms.

BACKGROUND

Monitoring vehicle movement and positioning is advantageous for fleet managers for a variety of reasons, including improving the safety of their fleet. Via real time monitoring, inappropriate behavior or dangerous situations can be identified, and a driver can be immediately alerted of the dangerous situation. Reports can be prepared indicating or summarizing dangerous situations. Such alerts or reports may reduce occurrence of traffic accidents. Following distance between vehicles is one important piece of movement data, and has significant safety implications. Further, monitoring vehicle movement and positioning is also useful in self-driving (autonomous) vehicles. For optimal effectiveness, high accuracy of monitoring equipment and algorithms is desired.

SUMMARY

According to a broad aspect, the present disclosure describes a system comprising: at least one processor; at least one non-transitory processor-readable storage medium storing processor executable instructions which, when executed by the at least one processor, cause the system to: access an image-based distance value corresponding to an image frame, the image-based distance value indicating a following distance between a first vehicle and a second vehicle, as output by an image-based distance determination model which analyzes the image frame as captured by an image capture device positioned at the second vehicle; access LIDAR data captured by a LIDAR sensor positioned at the second vehicle; correlate, by the at least one processor, data for a LIDAR frame of the LIDAR data to a timestamp of the image frame; apply, by the at least one processor, a clustering algorithm to the LIDAR frame to identify a cluster of LIDAR data points representing the first vehicle; determine, by the at least one processor, a LIDAR-based distance between the second vehicle and the cluster of LIDAR data points; and determine, by the at least one processor, a difference between the LIDAR-based distance and the image-based distance value.

The processor-executable instructions which cause the system to correlate the LIDAR frame to the timestamp of the image frame may cause the at least one processor to: synchronize the LIDAR data to a server clock to which the image frame is synchronized; and select the LIDAR frame from a plurality LIDAR frames data, based on the LIDAR frame having a timestamp which is closest to a timestamp of the image frame.

The processor-executable instructions may further cause the at least one processor to: execute a ground surface identification model on the LIDAR frame to identify a ground surface plane; and calibrate the LIDAR frame to compensate for a non-zero angle between the LIDAR sensor and the ground surface plane.

The processor-executable instructions may further cause the at least one processor to: identify a region of interest in the LIDAR frame positioned in front of the second vehicle. The processor executable instructions which cause the at least one processor to identify the region of interest may cause the at least one processor to: identify a lane of travel of the second vehicle based on the LIDAR frame; and identify the region of interest as being limited to the lane of travel. The processor-executable instructions which cause the at least one processor to identify the lane of travel of the second vehicle may cause the at least one processor to identify lane markings represented in the LIDAR frame which delineate the lane of travel in which the second vehicle is positioned.

The processor-executable instructions which cause the at least one processor to determine LIDAR-based distance between the second vehicle and the cluster of LIDAR data points may cause the at least one processor to identify the LIDAR based distance as a distance between the second vehicle and a data point in the cluster of LIDAR data points which is closest to the second vehicle.

The processor-executable instructions which cause the at least one processor to determine the LIDAR-based distance between the second vehicle and the cluster of LIDAR data points may cause the at least one processor to determine the LIDAR-based distance as a distance between the second vehicle and an average or median position of the cluster of LIDAR data points.

The processor-executable instructions may further cause the at least one processor to: if the difference between the LIDAR-based distance and the image-based distance value is within a threshold ratio of the LIDAR-based distance, label the image-based distance value as true; and if the difference between the LIDAR-based distance and the image-based distance value exceeds the threshold ratio of the LIDAR-based distance, label the image-based distance value as false.

The processor-executable instructions which cause the system to access an image-based distance value corresponding to an image frame may cause the system to: access, a plurality of image-based distance values, each image-based distance value indicating a respective following distance between a first vehicle and a second vehicle, as output by the image-based distance determination model which analyzes a respective image frame as captured by an image sensor positioned at the second vehicle; the processor-executable instructions which cause the at least one processor to correlate a LIDAR frame of the LIDAR data to a timestamp of the image frame may cause the at least one processor to: correlate a respective frame of a plurality of frames of the LIDAR data to respective timestamps of the plurality of image frames; the processor-executable instructions which cause the at least one processor to apply a clustering algorithm to the LIDAR frame to identify a cluster of LIDAR data points representing the first vehicle may cause the at least one processor to: apply the clustering algorithm to each LIDAR frame to identify a respective cluster of LIDAR data points representing the first vehicle for each LIDAR frame; the processor-executable instructions which cause the at least one processor to identify a LIDAR-based distance between the second vehicle and the cluster of LIDAR data points may cause the at least one processor to: identify a respective LIDAR-based distance between the second vehicle and the respective cluster of LIDAR data points for each LIDAR frame; and the processor-executable instructions which cause the at least one processor to determine a difference between the LIDAR-based distance and the image-based distance value may cause the at least one processor to: determine a respective difference between the LIDAR-based distance and the respective image-based distance value for each LIDAR frame. The processor-executable instructions may further cause the at least one processor to, for each LIDAR frame: if the respective difference between the respective LIDAR-based distance and the respective image-based distance value is within a threshold ratio of the respective LIDAR-based distance, label the respective image-based distance value as true; and if the respective difference between the respective LIDAR-based distance and the respective image-based distance value exceeds the threshold ratio of the respective LIDAR-based distance, label the respective image-based distance value as false. The processor-executable instructions may further cause the at least one processor to: determine image-based distance value accuracy for the plurality of image frames as a percentage of image frames of the plurality of image frames where the respective image-based distance value is labelled as true.

The system may further comprise the LIDAR sensor, and the processor-executable instructions which cause the system to access the LIDAR data may cause the LIDAR sensor to capture the LIDAR data.

The processor-executable instructions may further cause the system to: execute the image-based distance determination model on image data captured by the image capture device to generate the image-based distance value. The system may further comprise the image capture device, and the processor-executable instructions may further cause the system to: capture, by the image capture device, the image data.

The at least one processor may include a first processor positioned at the second vehicle and a second processor remote from the second vehicle; the processor executable instructions which cause the at least one processor to correlate data for the LIDAR frame to the timestamp of the image frame may cause the first processor to correlate the data for the LIDAR frame to the timestamp of the image frame; and the processor executable instructions which cause the at least one processor to apply the clustering algorithm, to determine the LIDAR-based distance, and to determine the difference between the LIDAR-based distance and the image-based distance value may cause the second processor to apply the clustering algorithm, to determine the LIDAR-based distance, and to determine the difference between the LIDAR-based distance and the image-based distance value.

According to another broad aspect, the present disclosure describes a method comprising: accessing an image-based distance value corresponding to an image frame, the image-based distance value indicating a following distance between a first vehicle and a second vehicle, as output by an image-based distance determination model which analyzes the image frame as captured by an image sensor positioned at the second vehicle; accessing LIDAR data captured by a LIDAR sensor positioned at the second vehicle; correlating, by at least one processor, data for a LIDAR frame of the LIDAR data to a timestamp of the image frame; applying, by the at least one processor, a clustering algorithm to the LIDAR frame to identify a cluster of LIDAR data points representing the first vehicle; determining, by the at least one processor, a LIDAR-based distance between the second vehicle and the cluster of LIDAR data points; and determining, by the at least one processor, a difference between the LIDAR-based distance and the image-based distance value.

Correlating the LIDAR frame to the timestamp of the image frame may comprise: synchronizing the LIDAR data to a server clock to which the image frame is synchronized; and selecting the LIDAR frame from a plurality LIDAR frames data, based on the LIDAR frame having a timestamp which is closest to a timestamp of the image frame.

The method may further comprise: executing, by the at least one processor, a ground surface identification model on the LIDAR frame to identify a ground surface plane; and calibrating, by the at least one processor, the LIDAR frame to compensate for a non-zero angle between the LIDAR sensor and the ground surface plane.

The method may further comprise: identifying, by the at least one processor, a region of interest in the LIDAR frame positioned in front of the second vehicle. Identifying the region of interest may comprise: identifying a lane of travel of the second vehicle based on the LIDAR frame; and identifying by the at least one processor, the region of interest as being limited to the lane of travel. Identifying the lane of travel of the second vehicle may comprise identifying lane markings represented in the LIDAR frame which delineate the lane of travel in which the second vehicle is positioned.

Determining LIDAR-based distance between the second vehicle and the cluster of LIDAR data points may comprise determining the LIDAR-based distance as a distance between the second vehicle and a data point in the cluster of LIDAR data points which is closest to the second vehicle.

Determining the LIDAR distance between the second vehicle and the cluster of LIDAR data points may comprise determining the LIDAR-based distance as a distance between the second vehicle and an average or median position of the cluster of LIDAR data points.

The method may further comprise: if the difference between the LIDAR-based distance and the image-based distance value is within a threshold ratio of the LIDAR-based distance, labelling the image-based distance value as true; and if the difference between the LIDAR-based distance and the image-based distance value exceeds the threshold ratio of the LIDAR-based distance, labelling the image-based distance value as false.

Accessing an image-based distance value corresponding to an image frame may comprise: accessing, a plurality of image-based distance values, each image-based distance value indicating a respective following distance between a first vehicle and a second vehicle, as output by the image-based distance determination model which analyzes a respective image frame as captured by an image sensor positioned at the second vehicle; correlating a LIDAR frame of the LIDAR data to a timestamp of the image frame may comprise: correlating a respective frame of a plurality of frames of the LIDAR data to respective timestamps of the plurality of image frames; applying a clustering algorithm to the LIDAR frame identify a cluster of LIDAR data points representing the first vehicle may comprise: applying the clustering algorithm to each LIDAR frame to identify a respective cluster of LIDAR data points representing the first vehicle for each LIDAR frame; identifying a LIDAR-based distance between the second vehicle and the cluster of LIDAR data points may comprise: identifying a respective LIDAR-based distance between the second vehicle and the respective cluster of LIDAR data points for each LIDAR frame; and determining a difference between the LIDAR-based distance and the image-based distance value may comprise: determining a respective difference between the LIDAR-based distance and the respective image-based distance value for each LIDAR frame. The method may further comprise, for each LIDAR frame: if the respective difference between the respective LIDAR-based distance and the respective image-based distance value is within a threshold ratio of the respective LIDAR-based distance, labelling the respective image-based distance value as true; and if the respective difference between the respective LIDAR-based distance and the respective image-based distance value exceeds the threshold ratio of the respective LIDAR-based distance, labelling the respective image-based distance value as false. The method may further comprise: determining image-based distance value accuracy for the plurality of image frames as a percentage of image frames of the plurality of image frames where the respective image-based distance value is labelled as true.

Accessing the LIDAR data may comprise capturing the LIDAR data by the LIDAR sensor.

The method may further comprise: executing the image-based distance determination model on image data captured by the image capture device to generate the image-based distance value. The method may further comprise capturing the image data by the image capture device.

The at least one processor may include a first processor positioned at the second vehicle and a second processor remote from the second vehicle; correlating data for the LIDAR frame to the timestamp of the image frame may comprise the first processor correlating the data for the LIDAR frame to the timestamp of the image frame; and applying the clustering algorithm, determining the LIDAR-based distance, and determining the difference between the LIDAR-based distance and the image-based distance value may comprise the second processor applying the clustering algorithm, determining the LIDAR-based distance, and determining the difference between the LIDAR-based distance and the image-based distance value.

BRIEF DESCRIPTION OF THE DRAWINGS

Exemplary non-limiting embodiments are described with reference to the accompanying drawings in which:

FIG. 10 is a top view of exemplary LIDAR data captured by a LIDAR unit, limited to a lane of travel of a vehicle.

FIG. 11 is a top view of exemplary LIDAR data captured by a LIDAR unit, limited to a lane of travel of a vehicle, showing distance to another vehicle.

FIG. 12 illustrates alerts for presenting results of following distance detection model validation to an operator, in accordance with two exemplary implementations.

FIG. 13 is a flowchart diagram which illustrates another method for validating an image-based following distance determination model.

FIG. 14 illustrates other alerts for presenting results of following distance detection model validation to an operator, in accordance with two exemplary implementations.

FIG. 15 is a flowchart diagram which illustrates a method for determining following distance, in accordance with at least one exemplary implementation.

FIG. 16 illustrates an exemplary image based on which following distance can be determined, in accordance with at least one exemplary implementation.

DETAILED DESCRIPTION

Figure 1:
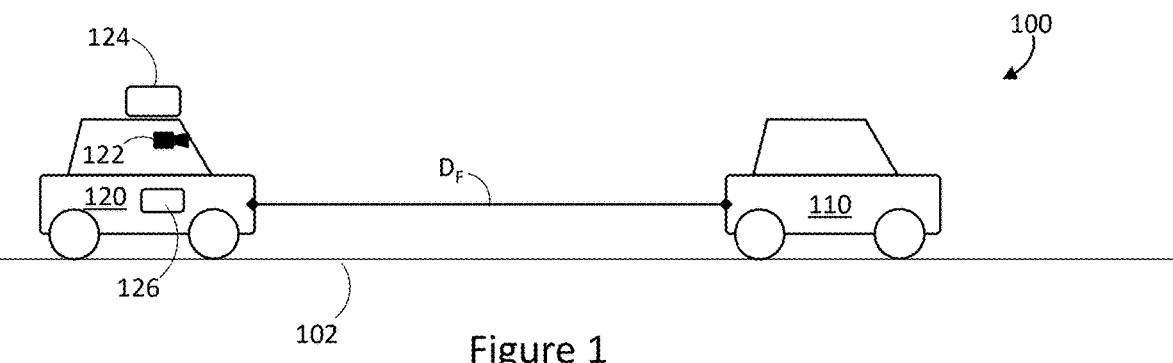
FIG. 1 is a side view of an exemplary scenario with a first vehicle and a second vehicle positioned behind the first vehicle.

The present disclosure details systems and methods for calibration and validation of output by vehicle movement and positioning detection equipment and models. The present disclosure sees particular value models used in detecting travel lane of vehicles, determining distance between vehicles, and identifying when a vehicle is tailgating another vehicle.

Throughout this disclosure, a "following" situation refers to a situation where a "following vehicle" is travelling behind a "lead vehicle", in the same direction as the lead vehicle. In this context, "following" does not necessarily mean that the following vehicle is actively pursuing the lead vehicle (e.g. to the destination of the lead vehicle), but rather that the following vehicle is travelling behind the lead vehicle, for at least a moment in time. Lead vehicles and following vehicles are commonly referred to as first and second vehicles throughout this disclosure.

"Tailgating" generally refers to a situation involving two vehicles travelling in the same direction, where one vehicle is following the other vehicle at an unsafe distance (e.g. too close for the following vehicle to reliably safely stop if needed). In particular, if a following vehicle is tailgating a lead vehicle, sudden braking of the lead vehicle may result in a collision where the following vehicle hits the lead vehicle from behind. For instance, delayed reaction time of the driver of the following vehicle may prevent the following vehicle from decelerating at a sufficient rate so as to avoid rear-ending the lead vehicle. However, if the driver of the following vehicle was alerted of this dangerous circumstance, an accident may be avoided, by causing the driver of the following vehicle to alter operation of the following vehicle to increase the following distance from the lead vehicle.

Models (e.g. artificial intelligence and/or machine learning models) for identifying vehicle positioning and movement, based on data captured by one or more image capture devices (e.g. video cameras or smart video cameras) are discussed herein. Generally, a machine learning model is trained based on a set of training data, after which the model becomes able to analyze input data and reliably detect features or make determinations based on the input data. In some implementations, a trained model is deployed to an image capture device or a peripheral device communicatively coupled to the image capture device, and captured image data is analyzed by the trained model. Such implementations are optimal for alerting the driver to dangerous situations, as analysis can be performed quickly without the need for communication with a remote server. In alternative implementations, captured image data is analyzed in accordance with the trained model remote from the image capture device (e.g. at a central server or processing station). Such implementations are useful for identifying dangerous situations after-the-fact, such as for driver evaluation or collision reconstruction. However, such implementations could also be used to alert the driver to dangerous situations as they happen, albeit after communication of image data to the central server, followed by a message from the server to a device at the vehicle to output an alert to the driver. In yet other implementations, captured image data can be analyzed at an image capture device or a proximate device communicatively coupled to the image capture device, and results can be sent to a remote device (e.g. a central server or processing station), such as for driver evaluation or collision reconstruction. In yet other implementations, captured image data can be analyzed at an image capture device or a proximate device communicatively coupled to the image capture device, for immediate driver feedback, and captured image data can be analyzed at a remote device such as for driver evaluation or collision reconstruction.

Determining following distance based on image data captured by an image capture device is desirable for a multitude of reasons. For example, LIDAR units (which can also be used to determine following distance) are expensive and can be bulky, such that it is desirable to limit their inclusion in vehicles (and so herein can be temporarily utilized to verify an image-based following distance determination model). In contrast, image capture devices can be less expensive and smaller. Further, image capture devices can serve additional functions, such as capturing image data for use in collision reconstruction, signage recognition, infrastructure condition monitoring, or any number of other applications.

FIG. 1 is a side view of a scenario 100 where a second vehicle 120 is positioned behind a first vehicle 110. First vehicle 110 can alternatively be referred to as a "lead vehicle" or "front vehicle"; second vehicle 120 can alternatively be referred to as a "following vehicle". Second vehicle 120 could also be referred to as an "ego vehicle", as vehicle 120 is the vehicle where data is collected and to which analysis is pertinent. Both vehicles 110 and 120 are travelling in the same direction on ground surface 102. FIG. 1 shows a following distance DF between the first vehicle 110 and the second vehicle 120.

Specific and non-limiting examples of vehicle types which each of vehicles 110 or 120 can be include: a government owned and operated vehicle, (e.g., as a vehicle for snow clearing, infrastructure maintenance, police enforcement), a public transportation vehicle, (e.g., bus, train), and a privately owned vehicle, (e.g., taxi, courier vehicle, passenger vehicle), among others.

Second vehicle 120 is shown as including an image capture device 122. Image capture device 122 can comprise (and be referred to herein) a smart video camera (SVC), though is not strictly limited as such. Image capture device 122 is positioned at (e.g. mounted in/on, or placed within or on) second vehicle 120. Specific and non-limiting examples of an image capture device or smart video camera include a Netradyne® video camera and a Nauto® video camera. Reference to a "camera" in this disclosure can include a smart video camera, but may also include a more basic camera. In this regard, the term "camera" can be used interchangeably with "image capture device". An image capture device or camera positioned or installed at a vehicle is commonly colloquially referred to as a "dash-cam".

Image capture device 122 may be mounted to or positioned at second vehicle 120 in a manner such that image capture device 122 captures image data of the environment outside the second vehicle 120, e.g., towards the windshield, towards a window, atop the vehicle, etc.

Alternatively, and/or optionally, image capture device 122 can be coupled to a person and/or object wherein the object is not a vehicle. For example, an image capture device 122 can be coupled to a person, e.g., a helmet of a motorcycle driver.

Second vehicle 120 is also shown as including a LIDAR unit 124. LIDAR unit 124 is positioned at (e.g. mounted in/on, or placed within or on) second vehicle 120. A specific and non-limiting example of LIDAR unit can include a Livox® LIDAR. LIDAR unit 124 may be mounted to or positioned at second vehicle 120 in a manner such that LIDAR unit 124 captures LIDAR data of the environment outside the second vehicle 120, e.g., forwards-facing, etc. Preferably, LIDAR unit 124 is removably mounted, such that LIDAR unit 124 can be removed when no longer needed and used with other vehicles.

Second vehicle 120 is also shown as including an onboard telematic device 126. Telematic device 126 may transmit raw vehicle data associated with second vehicle 120 to an external device as discussed later with reference to FIG. 5. In general, the telematic device 126 comprise sensing modules configured for sensing and/or measuring a physical property that may indicate an operating condition of a vehicle. For example, sensing modules may sense and/or measure a vehicle's position, (e.g., GPS coordinates), speed, direction, rates of acceleration or deceleration, for instance, along the x-axis, y-axis, and/or z-axis, altitude, orientation, movement in the x, y, and/or z direction, ignition state, transmission and engine performance, and times of operation among others. One of ordinary skill in the art will appreciate that these are but a few types of vehicle operating conditions that may be detected.

Telematic device 126 may comprise a sensing module for determining vehicle position. For instance, the sensing module may utilize Global Positioning System (GPS) technology (e.g., GPS receiver) for determining the geographic position (Lat/Long coordinates) of vehicle 114. Alternatively, the sensing module can utilize another global navigation satellite system (GNSS) technology, such as, GLONASS or BeiDou. Alternatively, the sensing module may further utilize another kind of technology for determining geographic position. In addition, the sensing module may provide other vehicle operating information, such as speed. Alternatively, the telematic device 126 may communicate with a plurality of sensing modules for a vehicle. Alternatively, vehicle position information may be provided according to another geographic coordinate system, such as, Universal Transverse Mercator, Military Grid Reference System, or United States National Grid.

In general, vehicle 120 may include various control, monitoring and/or sensor modules for detecting vehicle operating conditions. Some specific and non-limiting examples include, an engine control unit (ECU), a suspension and stability control module, a headlamp control module, a windscreen wiper control module, an anti-lock braking system module, a transmission control module, and a braking module. A vehicle may have any combination of control, monitoring and/or sensor modules. A vehicle may include a data/communication bus accessible for monitoring vehicle operating information, provided by one or more vehicle control, monitoring and/or sensor modules. A vehicle data/communication bus may operate according to an established data bus protocol, such as the Controller Area Network bus (CAN-bus) protocol that is widely used in the automotive industry for implementing a distributed communications network. Specific and non-limiting examples of vehicle operation information provided by vehicle monitoring and/or sensor modules include, ignition state, fuel tank level, intake air temp, and engine RPM among others.

Telematic device 126 may comprise a monitoring module operable to communicate with a data/communication bus of vehicle 120. The monitoring module may communicate via a direct connection, such as electrically coupling with a data/communication bus of vehicle 120 via a vehicle communication port (e.g., diagnostic port/communication bus, OBDII port). Alternatively, the monitoring module may comprise a wireless communication interface for communicating with a wireless interface of the data/communication bus of vehicle 120. Optionally, a monitoring module may communicate with other external devices/systems that detect operating conditions of the vehicle.

Figure 5:
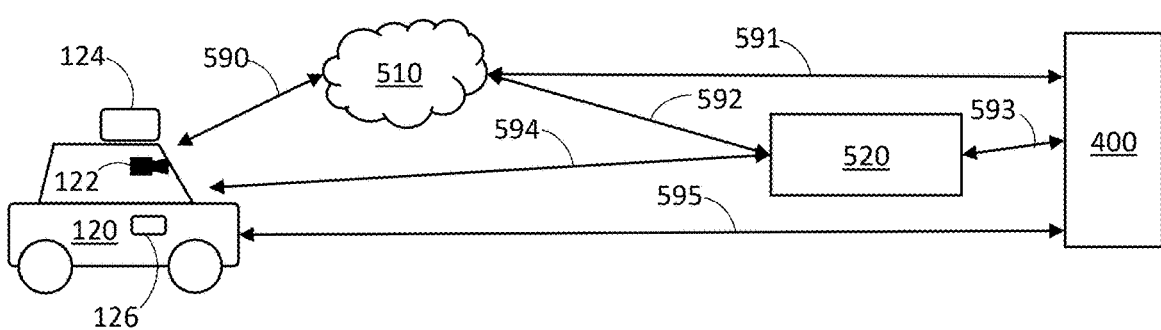
FIG. 5 is a simplified block diagram of a communication arrangement according to at least one exemplary implementation.

Telematic device 126 may be configured to wirelessly communicate with other devices via a wireless communication module. In some embodiments, telematic device 126 may directly communicate with one or more networks outside vehicle 120 to transmit data, such as shown in FIG. 5. A person of ordinary skill will recognize that functionality of some modules may be implemented in one or more devices and/or that functionality of some modules may be integrated into the same device.

Telematic devices 126 may transmit raw vehicle data, indicative of vehicle operation information collected thereby. The raw vehicle data may be transmitted at predetermined time intervals, (e.g. heartbeat), intermittently, and/or according to other predefined conditions. Raw vehicle data transmitted from telematic device 126 may include information indicative of device ID, position, speed, ignition state, and date and time operating conditions are logged, for instance, in an onboard datastore. One of ordinary skill in the art will appreciate that raw vehicle data may comprise data indicative of numerous other vehicle operating conditions. Raw vehicle data may be transmitted from a monitoring device when a vehicle is moving, stationary, and during both ON and OFF ignition states.

Telematic device 126 can be a monolithic device removably installed to vehicle 120 (e.g. by connection to a diagnostic port such as the OBDII port). Telematics device 126 could instead be integrated within vehicle 120. Telematics device 126 can also be a distributed device which exists as multiple components distributed through vehicle 120. Telematics device 126 could also be referred to as a "vehicle device", for its nature in collecting vehicle related data.

Figure 2A:
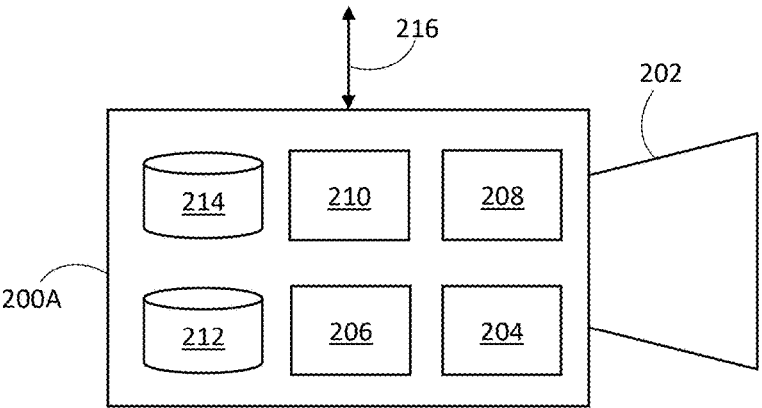
FIG. 2A is a simplified block diagram of an image capture device according to at least one exemplary implementation.

Now referring to FIG. 2A, shown is a simplified block diagram of exemplary image capture device 200A according to one implementation (as a smart video camera). Image capture device 200A as shown in FIG. 2A can be implemented as image capture device 122 shown in FIG. 1. Image capture device 200A includes lens 202, optoelectronics 204, at least one processor 206, location module 208 (e.g., including a GPS receiver), wireless communication module 210 (e.g., including a 4G or 5G communication module for providing cellular connectivity) and at least one non-transitory processor-readable storage medium 212. Optionally, the at least one non-transitory processor-readable storage medium 212 includes another non-transitory processor-readable storage medium 214 (or includes any appropriate number of additional non-transitory processor-readable storage mediums). In the context of this disclosure, the term "datastore" refers to a non-transitory processor-readable storage medium. In some implementations, a single non-transitory processor-readable storage medium corresponds to a single datastore. In other implementations, a non-transitory processor-readable storage medium can be virtually partitioned to include a plurality of "datastores". Wireless communication module 210 is operable to communicate (shown as communication pathway 216) with other devices (e.g. telematics device 126, cloud 510, server 520, or operator device 400 as shown in FIG. 5) over at least one communication network.

Figure 2B:
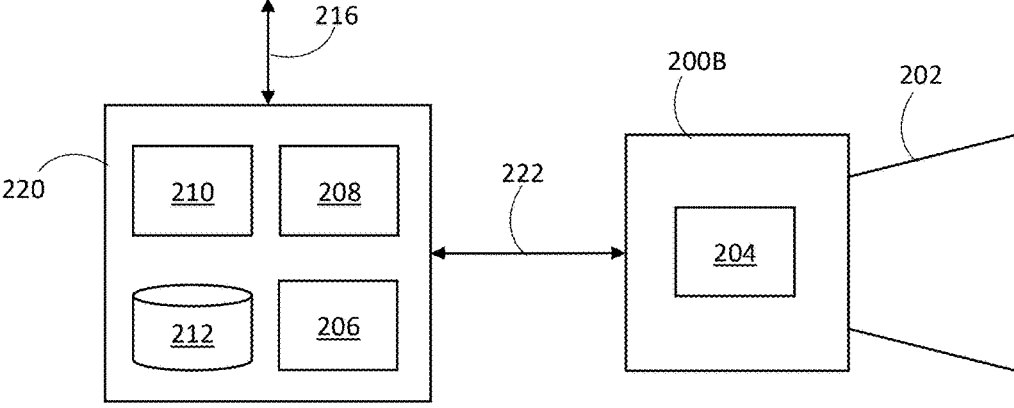
FIG. 2B is a simplified block diagram of an image capture device according to at least one other exemplary implementation.

Now referring to FIG. 2B, shown is a simplified block diagram of exemplary image capture device 200B according to one implementation (as a camera which is coupled to a peripheral device, such as a vehicle device or telematics device). FIG. 2B includes many components with the same reference number as components discussed with reference to FIG. 2A. The description of such components in FIG. 2A is applicable to the similarly numbered components in FIG. 2B. In FIG. 2B, image capture device 200B includes lens 202 and optoelectronics 204. In this implementation, image capture device 200B is itself directed to capturing image data, which is in turn provided to a peripheral device 220 via a communication interface 222 (e.g. a wired or wireless communication interface). In some implementations, peripheral device 220 is vehicle device, such as a telematics monitoring device positioned at a vehicle. In other implementations, peripheral device 220 comprises a collection of components integrated into a vehicle which communicate with each other (e.g. OEM integrated electronics). In FIG. 2B, peripheral device 220 is shown as including the at least one processor 206, the location module 208, the wireless communication module 210, and the at least one non-transitory processor-readable storage medium 212, similar to the components included in image capture device 200A in FIG. 2A. While not illustrated in FIG. 2B to reduce clutter, the at least one non-transitory processor-readable storage medium 212 optionally includes any appropriate number of additional non-transitory processor-readable storage mediums. Wireless communication module 210 is operable to communicate (shown as communication pathway 216) with other devices (e.g. telematics device 126, cloud 510, server 520, or operator device 400 as shown in FIG. 5) over at least one communication network.

Collectively, reference to an image capture device 200 or a plurality of image capture devices 200 can include image capture device 200A in FIG. 2A or image capture device 200B in FIG. 2B. Further, reference to an image capture device performing acts (such as in the methods discussed herein) can also refer to the peripheral device 220 performing such acts. For example, reference to an image capture device performing processing, determination, identification, storing of data, transmission, or similar acts can refer to an image capture device and peripheral device in combination performing these acts.

Figure 3:
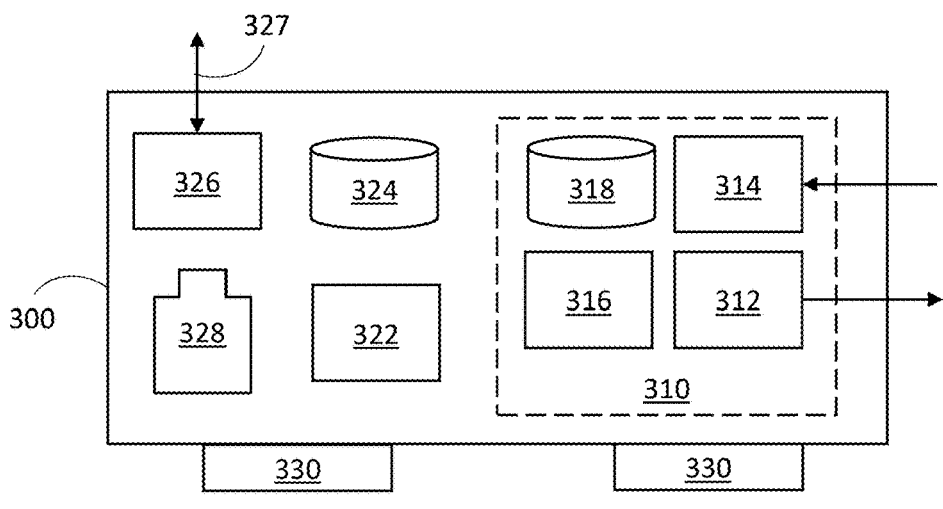
FIG. 3 is a simplified block diagram of an image capture device according to at least one other exemplary implementation.

Now referring to FIG. 3, shown is a simplified block diagram of exemplary LIDAR unit 300 according to one implementation. LIDAR unit as shown in FIG. 3 can be implemented as LIDAR unit 124 shown in FIG. 1.

LIDAR unit 300 as shown includes a LIDAR module 310, which in turn includes a laser output 312, and laser receiver 314, at least one processor 316, and at least one non-transitory processor readable storage medium 318. Generally, laser output 312 transmits laser light into the environment (commonly via a scanning mirror which sweeps the laser light over the environment), laser receiver 314 receives reflected laser light, the at least one processor 316 processes and formats data representing the received laser data, and non-transitory processor-readable storage medium 318 stores processor-executable instructions which when executed by processor 316 cause LIDAR module 310 to perform any of the above functions. The at least one non-transitory processor-readable storage medium 318 can also stored LIDAR data, as appropriate.

LIDAR module 310 could for example be a monolithically packaged LIDAR device, which captures and formats LIDAR data (such as can be purchased from LIDAR supplier Livox®). In some implementations, LIDAR unit 300 can be limited to including LIDAR module 310, with any other functions being performed by external hardware which receives LIDAR data from LIDAR module 310. In other implementations (such as shown in FIG. 3), LIDAR unit 300 can include additional hardware, such as at least one processor 322, at least one non-transitory processor-readable storage medium 324, communication interface 326, and power source 328. The at least one processor 322 could for example perform analysis, formatting, compression, modification, or any other appropriate operations on LIDAR data from LIDAR module 310. The at least one processor 322 could also execute processor executable instructions stored at non-transitory processor-readable storage medium 324, to cause LIDAR unit 300 to perform any of its designated functions. The at least one non-transitory processor-readable storage medium 324 can store any appropriate instructions, or could stored LIDAR data from LIDAR module 310 (either before or after additional processing by processor 322). The at least one communication interface 326 can communicate with external devices or communication networks, and can transmit LIDAR data from LIDAR module 310 (either before or after additional processing by processor 322) over communication pathway 327. The at least one communication pathway can be a wired or wireless interface. Power source 328 can for example be a battery, to improve portability and ease of install to a vehicle; however LIDAR unit 300 could be powered by a wired connected to a vehicle power system instead.

LIDAR unit 300 as shown in FIG. 3 includes mounting hardware 330 for installation to a vehicle. In the illustrated example, mounting hardware 330 includes a plurality of magnets, which enable LIDAR unit 300 to be installed to a vehicle by just placing it on a metal roof or hood of the vehicle.

Figure 4:
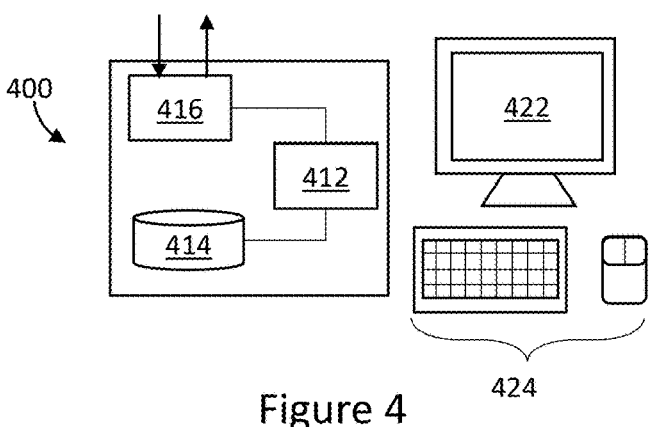
FIG. 4 is a schematic view of an operator device in accordance with at least one exemplary implementation.

FIG. 4 is a schematic view of an operator device 400, which could be used for data analysis, management, or other use in any of the implementations discussed herein, and in particular is useful as a server-side device. For example, device 400 could be used as client device for interfacing with a management server, or could itself be a management server. Device 400 as illustrated includes at least one processor 412, at least one non-transitory processor-readable storage medium 414, and a communication interface 416. The non-transitory processor-readable storage medium 414 can have processor-readable instructions stored thereon which, when executed by the at least one processor 412 cause the device 400 to perform appropriate operations for the methods described herein. Communication interface 416 can be a wired or wireless interface, through which data and inputs can be provided to device 400, and through which data and outputs can be provided by device 400. For example, image data and/or LIDAR data for any number of vehicles can be received from a vehicle device (e.g. telematics device) or system by communication interface 416, for processing and analysis by the at least one processor 412. Resulting analysis can also be output by communication interface 416.

FIG. 4 also illustrates exemplary input and output devices through which a user or operator can interact with device 400. In particular, FIG. 4 shows a display 422, which can display outputs from device 400. Other output devices could be provided such as speakers, or any other appropriate output device. FIG. 4 also shows a keyboard and mouse 424, which can be used to provide inputs to the device 400. Other input devices could also be used, such as a touchscreen, microphone, trackpad, or any other appropriate input device. Although the input and output devices illustrated in FIG. 4 appear in the form of those used with a desktop computer, other forms of devices could also be used, such as portable devices like a laptop, smartphone, PDA, tablet, or any other appropriate device. Further, a device to which a user provides input and receives output can be remote from the device 400. For example, the device including the at least one processor 412, the at least one non-transitory processor-readable storage medium 414, and the communication interface 416 can be a server, which is remote from a workstation or device with which the user interacts.

FIG. 5 is a block diagram which illustrates exemplary communication pathways between devices at a vehicle (vehicle 120 in the illustrated example) and external devices (server 520 and/or operator device 400 in the illustrated example).

In some implementations, devices at the vehicle (e.g. image capture device 122, LIDAR unit 124, and/or telematics device 126) collectively transmit data through a single device (e.g. image capture device 122 and LIDAR unit 124 can provide data to telematics device 126, which transmits said data). In other implementations, respective devices at the vehicle can include respective communication hardware to transmit data independently (e.g. image capture device 122, LIDAR unit 124, and/or telematics device 126 can include respective communication interfaces which transmit data separately). Regardless, data can be transmitted from the vehicle via several different optional communication pathways.

In some examples, data is transmitted from the vehicle to cloud 510 (e.g. a collection of communication stations and servers) via communication pathway 590. In one example cloud 510 in turn transmits the data to operator device 400 via communication pathway 591. In another example, cloud 510 transmits the data to a server 520 via communication pathway 592, which in turn transmits the data to operator device 400 via communication pathway 593.

In yet another example, data is transmitted from the vehicle to server 520 via communication pathway 594, which in turn transmits the data to operator device 400 via communication pathway 593.

In yet another example, data is transmitted from the vehicle to operator device 400 via communication pathway 595. In such an example, operator device 400 could be a portable device (e.g. a laptop, smartphone, tablet, or similar), which communicates with the at least one device at the vehicle by short range communication (e.g. WiFi®, Bluetooth®, ZigBee®, or similar).

Generally, communication pathways 590, 591, 592, 593, 594, and/or 595 may include one or more suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication networks may operate according to one or more communication protocols, such as, General Packet Radio Service (GPRS), Universal Mobile Telecommunications Service (UMTS), GSM®, Enhanced Data Rates for GSM Evolution (EDGE), LTE™, CDMA, LPWAN, Wi-Fi®, Bluetooth®, Ethernet, HTTP/S, TCP, and CoAP/DTLS, or other suitable protocol. Communication networks may take other forms as well.

Figure 6:
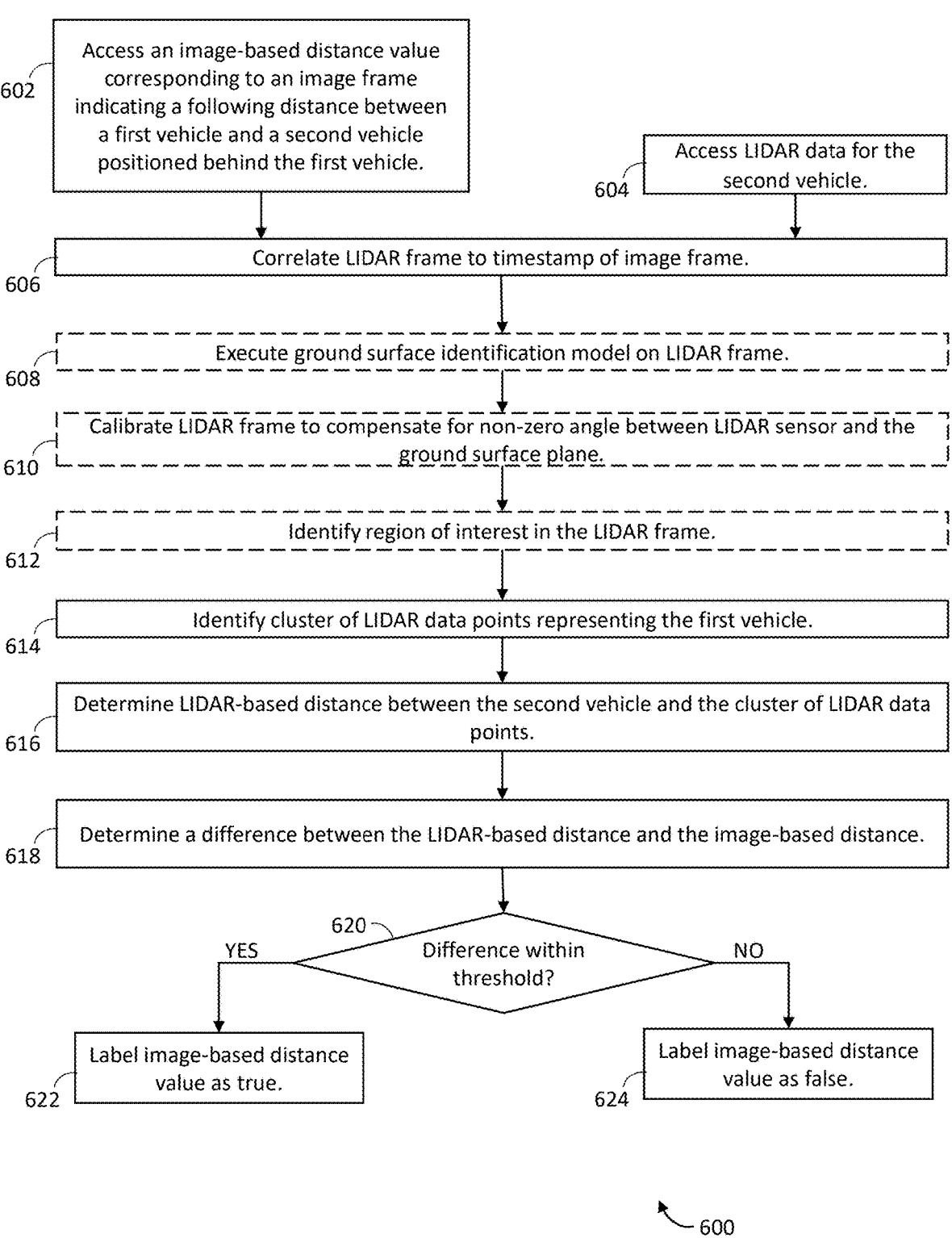
FIG. 6 is a flowchart diagram which illustrates a method for validating an image-based following distance determination model.

FIG. 6 is a flowchart diagram which illustrates an exemplary method 600 for calibrating and/or validating a following distance detection system and/or algorithm. Method 600 as illustrated includes acts 602, 604, 606, 608, 610, 612, 614, 616, 618, 620, 622, and 624. One skilled in the art will appreciate that additional acts could be added, acts could be removed, or acts could be reordered as appropriate for a given application. For example, at least acts 608, 610, and 612 are shown in dashed lines to highlight that these acts are optional. With reference to the examples illustrated in FIGS. 1, 2A, 2B, 3, 4, and 5, acts can be performed by appropriate components of the discussed systems or devices. For example, method 600 can be at least partially performed at an image capture device such as image capture device 200A discussed with reference to FIG. 2A, and/or a peripheral device such as peripheral device 220 discussed with reference to FIG. 2B. As another example, method 600 can be performed at least partially at a device remote from a vehicle, such as operator device 400 or server 520 discussed with reference to FIGS. 4 and 5. As another example, method 600 can be performed jointly between a device at the vehicle and a device remote from the vehicle, as is discussed later. Method 600 can be implemented in a system, where at least one processor-readable storage medium stores processor executable instructions which, when executed by at least one processor, cause the system to perform the acts of method 600.

Reference to "at least one processor" or "a processor" performing acts of any of the methods herein can refer to any appropriate processor. Further, at least one non-transitory processor-readable storage medium can store processor-executable instructions, which when executed by a respective at least one processor cause the corresponding system or device to perform a given act of any of the methods discussed herein.

At 602, an image-based distance value corresponding to an image frame is accessed. In this context, and "image frame" refers to a single image representing a moment in time, and is typically associated with a timestamp (whether relative to other image frames in a video file, or relative to an absolute time value). The image-based distance value indicates a following distance between a first vehicle (e.g. vehicle 110) and a second vehicle positioned behind the first vehicle (e.g. vehicle 120). The image-based distance value is output by an image-based distance determination model which analyzes the image frame. The image frame is captured by at least one image capture device at the vehicle (e.g. image capture device 122). In some implementations, capturing of the image frame, and execution of the image-based distance determination model is included in the scope of the method 600. In other implementations, capturing of the image frame and execution of the image-based distance determination model is outside of the scope of the method 600.

The image frame as captured by the image capture device can be stored by an appropriate non-transitory processor-readable storage medium (e.g. medium 212 in FIGS. 2A and 2B). In some implementations, execution of the image-based distance determination model is performed at the image capture device or at another device at the vehicle (e.g. at telematics device 126). In other implementations, the image frame is transferred from the image capture device to another device (such as from image capture device 122 in FIG. 5 to cloud 510, server 520, or operator device 400) as appropriate, and execution of the image-based distance determination model is performed at the other device. An example image-based distance determination model is described later with reference to FIGS. 15 and 16, and in U.S. Provisional Patent Application Nos. 63/456,179, 63/526,233, 63/537,875, 63/606,307 and U.S. Non-Provisional patents application Ser. Nos. 18/133,714, 18/133,752, 18/133,797, 18/133,835, 18/224,208, 18/224,360, 18/620, 408, 18/620,486, 18/620,520, 18/808,429, all of which are incorporated by reference herein in their entirety.

At 604, LIDAR data for the second vehicle is accessed. In this context, LIDAR data can refer to raw output from LIDAR unit 300 (or directly from LIDAR module 310). The LIDAR data can be a time-based set of data which indicates a field of data points (a point cloud) of varying intensities, indicative of strength of reflected laser light from corresponding physical points in the environment. That is, the LIDAR data can indicate an x coordinate, y coordinate, z coordinate, timestamp, and reflective intensity (reflective T score) for each point of received laser light. LIDAR data can be output as a .lsv or .csv file as examples, or can be formatted in any other appropriate format. Similar to image data, LIDAR data as captured can be conceptualized as a plurality of "LIDAR frames", where each LIDAR frame refers to LIDAR data representing a corresponding moment in time, and is typically associated with a respective timestamp, whether relative to other times in the LIDAR data (e.g. a start time of LIDAR data collection), or relative to an absolute time value (e.g. a universal clock or server clock). As an example, in collection of LIDAR data, laser light from the LIDAR unit is typically "swept" over a region (e.g. by a scanner mirror rotating the laser light over the region). Each "sweep" of the laser light (as received by a receiver of the LIDAR unit) can correspond to a respective LIDAR frame.

At 608, a LIDAR frame of the LIDAR data is correlated to a timestamp of the image frame. At time of or prior to capture, a clock at the image capture device 122 and a clock at the LIDAR unit 300 can be synchronized (e.g. to a cloud-based clock or a clock at a server) so that timestamps in captured image data and timestamps in the LIDAR data are based on a common synchronized clock. In many cases the LIDAR data may be captured at a different frequency than the image data which includes the image frame, and/or the LIDAR data may be captured temporally offset from timestamps of image frames in the image data. To address this, the at least one processor can select a particular LIDAR frame from a plurality of LIDAR frames in the LIDAR data, based on temporal proximity to the image frame on which the image-based distance value as accessed at 602 is derived. That is, the LIDAR frame which is closest in time to the image frame can be selected as the particular LIDAR frame to which the rest of method 600 pertains. In some implementations, this selection can be direction agnostic (the LIDAR frame can be before or after the image frame in time. In other implementations, selection of the LIDAR frame can be limited in direction (e.g. the particular LIDAR frame may be the closest LIDAR frame which comes after the image frame, or the particular LIDAR frame may be the closest LIDAR frame which comes before the image frame).

Throughout the remainder of method 600, the "LIDAR frame" referred to is the particular LIDAR frame correlated to the image frame as discussed for act 606.

Acts 608, 610, and 612 are optional.

At 608, the at least one processor executes a ground surface identification model on the LIDAR frame to identify a ground surface plane in the environment of the vehicle. At 610, the at least one processor calibrates the LIDAR frame (the LIDAR data points in the LIDAR frame) to compensate for non-zero angle between the LIDAR sensor which captures the LIDAR data in the LIDAR frame and the ground surface plane. These acts are discussed in detail below with reference to FIGS. 7 and 8.

Figure 7:
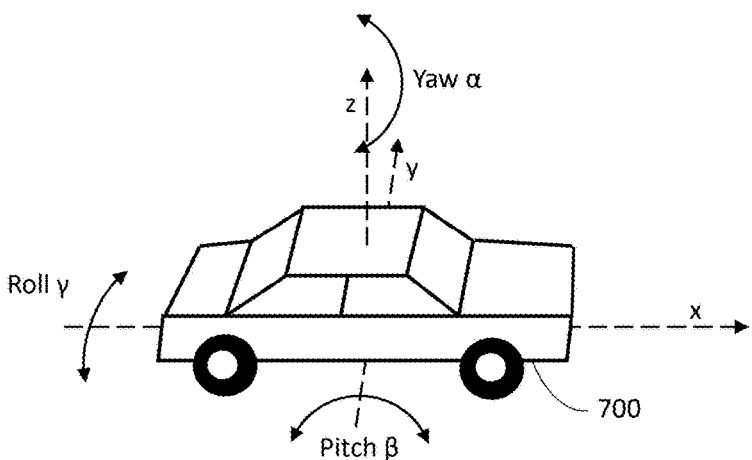
FIG. 7 is an isometric view showing rotation angles relative to a vehicle.

FIG. 7 is an isometric view of a vehicle 700, showing different angles of rotation a LIDAR unit could have relative to the vehicle 700. A LIDAR unit may be rotated at different angles for a variety of reasons. For example, a vehicle roof surface is typically not completely flat, and thus a LIDAR unit positioned thereon may rest askew. As another example, and installer of the LIDAR unit may not necessarily carefully align the LIDAR unit to be exactly aligned in a particular direction.

FIG. 7 shows three axes x, y, and z. A "roll" angle γ refers to rotation about the x axis; a "pitch" angle β refers to rotation about the y axis; and a "yaw" angle α refers to rotation about the z axis. Roll angle γ and pitch angle β can be compensated for based on a ground surface; that is the LIDAR data can be adjusted to align with the ground surface to account for the roll and pitch angles. Yaw angle α can be compensated for based on lane markings, as discussed later with reference to FIGS. 9, 10, and 11. Ground identification and compensation/calibration based thereon can be performed using a RANSAC (Random Sample Consensus) approach. Equation (1) below illustrates determination of a compensation transformation for slope based on the ground surface, and is preferably performed based on one or more LIDAR frames where the ground surface in front of the vehicle is flat and level and straight.

(or from the LIDAR unit on the vehicle). The vertical axis of each plot shows height relative to the vehicle (or to the LIDAR unit on the vehicle); i.e. the vertical axis shows a position along the z axis.

Figure 8:
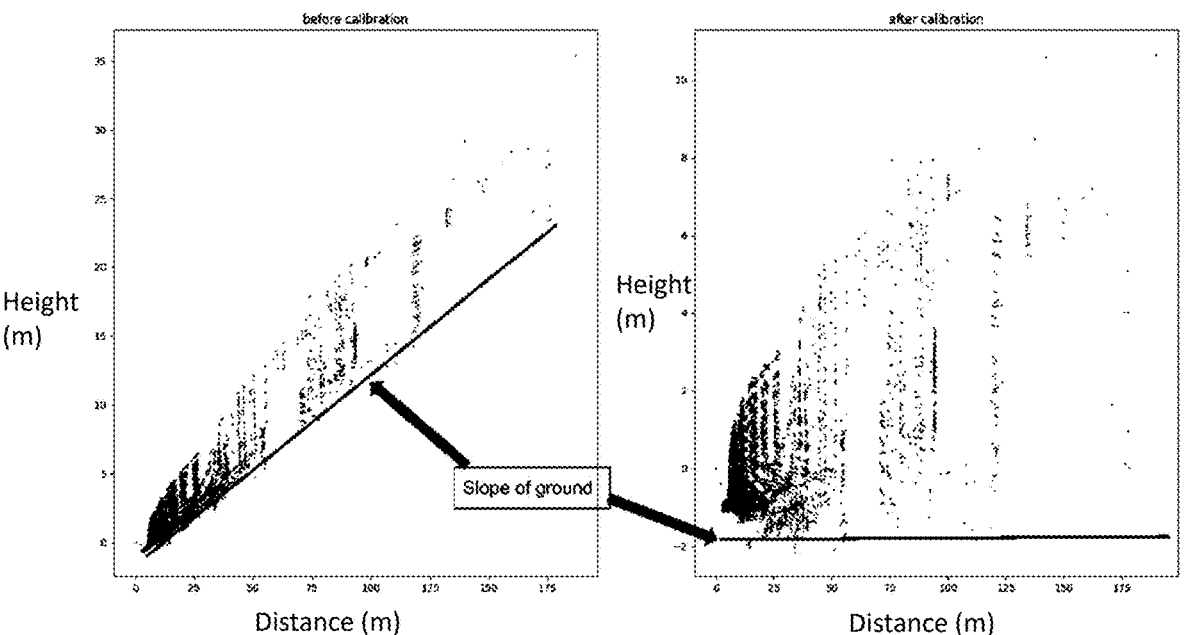
FIG. 8 illustrates plot diagrams showing calibration for a ground surface according to at least one illustrated example.

In the "before calibration" plot in FIG. 8, the ground surface can be seen to "slope up" relative to the LIDAR unit. However, if the vehicle is facing flat, straight ground, than this "slope up" is not actually the ground sloping up, but rather illustrates that the LIDAR unit is sloping down towards the ground (i.e. the LIDAR unit has a pitch angle β where the LIDAR unit is tilted downwards or forwards relative to the vehicle). In the "after calibration" plot in FIG. 8, the LIDAR data has been calibrated to "flatten" the ground slope (or more particularly, to adjust the LIDAR data to account for the pitch angle of the LIDAR unit, i.e. so that the data represents a state where pitch angle is 0). As can be seen in the "after calibration" plot, the ground level is nearly-2 meters. This is because the LIDAR unit is positioned on top of the vehicle (in the example) which is nearly 2 meters high, and the height is expressed relative to the LIDAR unit.

Calibrating the LIDAR frame based on the ground surface plane as in act 610 can also include removing (or ignoring) data points representing the ground surface. This can be achieved by removing (or ignoring) data points with a z value below a certain threshold. As mentioned above with reference to the example in FIG. 8, the ground has a height of nearly −2 meters (relative to the LIDAR unit height of 0); in this example the ground could be removed/ignored by removing/ignoring data points with a z value below −1.5 meters. Further, data points unlikely to represent other vehicles could also be removed/ignored, for example by removing/ignoring data points which have a z value above another threshold (e.g. 2 meters above the LIDAR unit).

Returning to method 600, at 612 the at least one processor identifies a region of interest in the LIDAR frame. For example, a lane detection algorithm, machine learning model, or clustering methodology can be applied to the LIDAR frame to identify a lane of travel of the vehicle (a lane of travel in front of the LIDAR unit. For example, the at least one processor can execute a linear clustering algo- $$R = R_z(\alpha)R_y(\beta)R_x(\gamma) = \begin{bmatrix} \overset{yaw}{\cos\alpha} & -\sin\alpha & 0 \\ \sin\alpha & \cos\alpha & 0 \\ 0 & 0 & 1 \end{bmatrix} \begin{bmatrix} \overset{pitch}{\cos\beta} & 0 & \sin\beta \\ 0 & 1 & 0 \\ -\sin\beta & 0 & \cos\beta \end{bmatrix} \begin{bmatrix} \overset{roll}{1} & 0 & 0 \\ 0 & \cos\gamma & -\sin\gamma \\ 0 & \sin\gamma & \cos\gamma \end{bmatrix} \quad (1)$$

$$= \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix}$$

Equation (1) illustrates a transformation matrix R, which itself is the product of $R_x$ (transformation matrix for roll γ), $R_y$ (transformation matrix for pitch β), and $R_z$ (transformation matrix for yaw α), which can be applied to points in the data point cloud to compensate the data point cloud for slope of the LIDAR unit.

FIG. 8 illustrates two plots: the left plot is a LIDAR point cloud prior to calibration, and the right plot is the same LIDAR point cloud, but calibrated based on the ground surface as discussed above. The plots in FIG. 8 are side-views of the LIDAR point cloud plotted along the y-axis and z-axis. That is, the plots in FIG. 8 represent a side view where the vehicle is positioned at the left-most edge of the plot, and is facing towards the right side of the plot. The horizontal axis of each plot shows distance from the vehicle rithm which identifies data points representing linear lane markings, which define boundaries of a lane in front of the LIDAR unit (and thus a lane of travel of the vehicle which carries the LIDAR unit). As another example, data points representing lane marking can be identified based on a reflective T score (reflectivity or intensity of each data point), and data points identified as representing lane markings can be clustered together to establish direction and scale of said lane markings.

Figure 9:
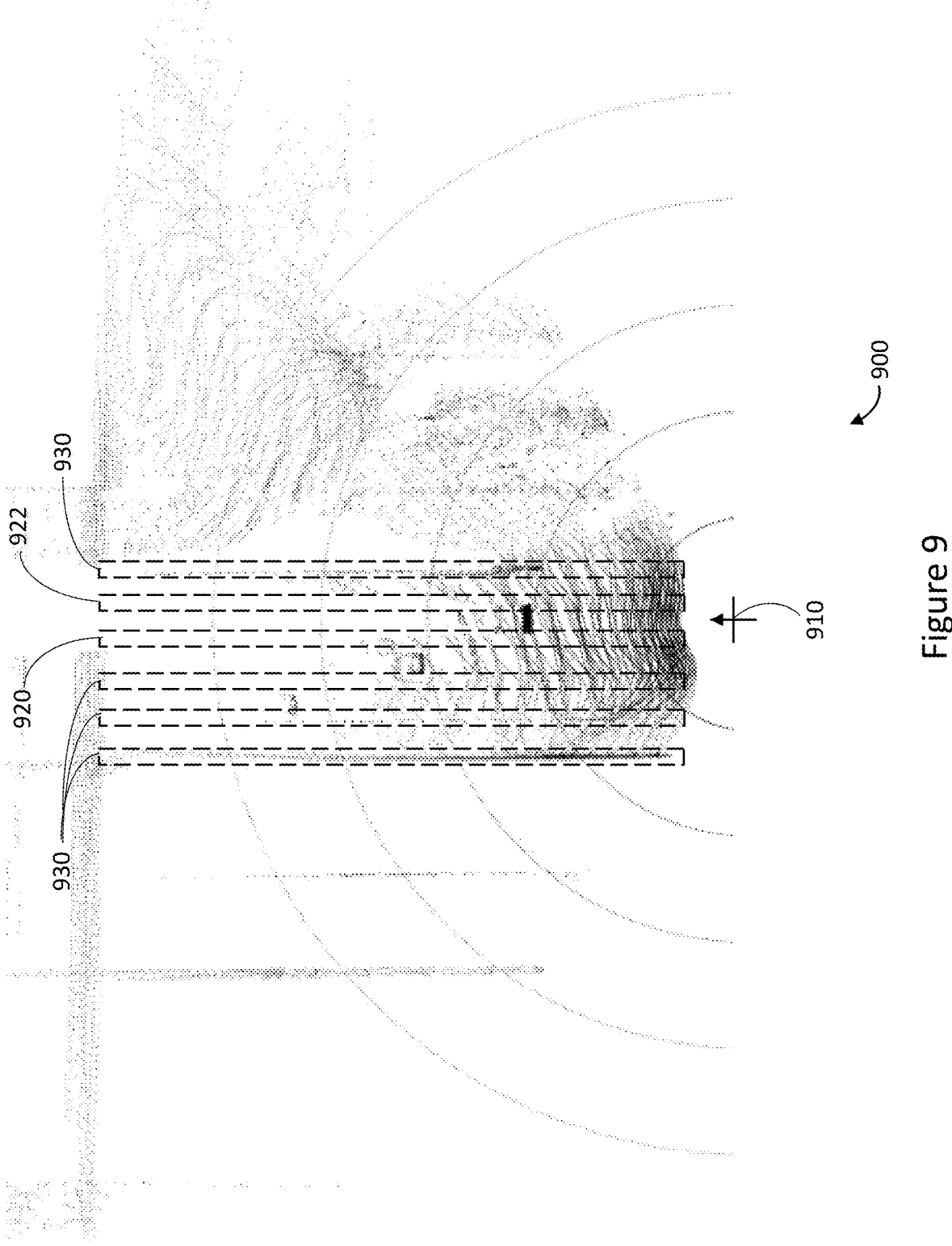
FIG. 9 is a top view of exemplary LIDAR data captured by a LIDAR unit.

FIG. 9 is a top view of a LIDAR data frame, which shows a LIDAR data point cloud 900 representing objects detected by the LIDAR unit. Point 910 illustrates a location of the LIDAR unit which captures data point cloud 910 (and thus also the location of the vehicle which carries the LIDAR unit). Point 910 is represented by a cross shape, with an arrow indicating the facing of the LIDAR unit/vehicle (towards the top of FIG. 9). FIG. 9 also illustrates a cluster of data points 920 representing a left boundary of a lane of travel in front of the LIDAR unit vehicle, and a cluster of data point 922 representing a right boundary of the lane of travel. As an example, the at least one processor can execute a clustering algorithm such as DBSCAN (Density-based spatial clustering of applications with noise) to determine clusters of data points 920 and 922 corresponding to lane markings.

FIG. 9 also shows several other linear point clusters 930. Each of these point clusters 930 represents either additional lane markings or boundaries of the road. In such a scenario where multiple linear clusters are identified, the at least one processor can determine boundaries of the lane of travel of the first vehicle as the linear clusters of data points which are closest to the position of the LIDAR unit or vehicle 910. In the illustrated example, clusters of data points 920 and 922 are linear clusters which are immediately to the right and to the left of point 910, and therefore represent the respective right and left boundaries of the lane of travel of the vehicle.

Returning to method 600, at 614 the at least one processor identifies a cluster of LIDAR data points representing a first vehicle (e.g. vehicle 110) positioned in front of the second vehicle (e.g. vehicle 120) which carries the LIDAR unit. For example, the at least one processor can execute a clustering algorithm such as DBSCAN to identify a cluster of data points sufficiently dense to represent a vehicle.

FIG. 10 is a top view which illustrates an exemplary portion of LIDAR data from a LIDAR frame. In particular, FIG. 10 illustrates LIDAR data 1000 captured by a LIDAR unit positioned at point 1010, facing to the right of the figure. The LIDAR data 1000 has been filtered or limited to LIDAR data between lane markings (as shown and discussed with reference to FIG. 9). Further, a clustering algorithm has been executed on the LIDAR data 1000 to identify cluster of data points 1020 representing a vehicle in front of the LIDAR unit/vehicle positioned at 1010.

Returning to method 600, at 616 the at least one processor determines a LIDAR-based distance between the second vehicle and the cluster of LIDAR data points representing the first vehicle. Examples are shown in FIG. 11. FIG. 11 is a top view which illustrates the exemplary portion of LIDAR data 1000 as shown in FIG. 10. In one illustrated example, the at least one processor determines the LIDAR-based distance in act 616 as the horizontal distance between the LIDAR unit at point 1010 and the closest data point 1022 of the data point cluster 1020 (shown as distance 1032 in FIG. 11). In another illustrated example, the at least one processor determines the LIDAR-based distance in act 616 as the horizontal distance between the LIDAR unit at point 1010 and a median or average point 1024 of the data point cluster 1020 (shown as distance 1034 in FIG. 11). The distance could for example be determined as the x-coordinate of the data point 1022 or 1024 (i.e., distance along the x axis). Such an example works particularly well if the yaw angle α is 0 or close to 0. As another example, the distance could be determined as the length of a vector between point 1010 and 1022 or 1024 (e.g. by applying Pythagoras' theorem to the x and y coordinates of point 1022 or 1024). Such an implementation would account for a non-zero yaw angle α.

Returning to method 600, at 618, the at least one processor determines a difference between the LIDAR-based distance determined at 616 and the image-based distance value accessed at 602. LIDAR data can be highly accurate (e.g. can measure distances accurate to within 2 cm up to 150 m).

In this sense, the LIDAR-based distance is considered as "ground truth" data, in that the LIDAR-based distance is assumed to be very accurate (at least more accurate than the image-based distance value). In this regard, absolute difference between the image-based distance value and a corresponding LIDAR based distance can be referred to as "error" of the image-based distance value. Error can be expressed as shown in Equation (2) below:

$$\text{Absolute Error} = |LIDAR \text{ distance} - \text{Image distance}| \qquad (2)$$

In Equation (2), Absolute Error refers to the error of the image-based distance value, as an absolute value. "LIDAR distance" refers to the LIDAR-based distance as determined at 616. "Image distance" refers to the image-based distance value accessed at 602. Error can also be characterized as an "Error Rate" as shown in Equation (3) below:

$$\text{Error Rate} = \frac{\text{Absolute Error}}{LIDAR \text{ distance}} * 100\% \qquad (3)$$

In Equation (3), "Error Rate" is expressed as a percentage, indicting the proportion of the Absolute Error to the LIDAR distance. At 620, the determined difference is compared to a difference threshold (alternatively referred to as an Error Margin). In some implementations, the difference threshold can be 10% or 15% of the LIDAR-based following distance. The exact difference threshold can be set as appropriate for a given application.

If the difference is within the difference threshold at 620, method 600 proceeds to act 622, where the at least one processor labels the image-based distance value as true. This indicates that the image-based distance value is deemed sufficiently accurate. If the difference is not within (i.e. exceeds) the difference threshold at 620, method 600 proceeds to act 624, where the at least one processor labels the image-based distance value as false. This indicates that the image-based distance value is deemed to not be sufficiently accurate. This is expressed in Equation (4) below:

$$\text{If Error Rate} < \text{Error Margin then True; else false} \qquad (4)$$

While Equation (4) uses the less than (<) operator, less than or equal to (≤) could be used instead.

The labels "true" and "false" applied at 622 and 624 can both be implemented in some implementations. In other implementations, only one of the true or false labels may be applied, with the other label being implied. For example, when the difference is within the difference threshold at 620, the true label can be applied at 622; but when the difference is not within the difference threshold at 620, then no label could be applied, and the image-based distance can be implicitly understood to be "false" or inaccurate because of the lack of label. Alternatively, when the difference is not within the difference threshold at 620, the "false" label can be applied at 624; but when the difference is within the difference threshold at 620, then no label could be applied, and the image-based distance can be implicitly understood to be "true" or accurate because of the lack of a "false" label.

Labelling the image-based distance at 622 and/or 624 can comprise storing label data associated with the image-based distance value (e.g. storing a companion file at a non-transitory processor-readable storage medium, together with the image-based distance value). As another example, labelling the image distance at 622 and/or 624 can comprise modifying a dataset which includes the image-based distance value, to include metadata or label data which includes labels applied at 622 and/or 624. The labels at 622 and 624 do not necessarily have to be stored with the image data to which the labels pertain. In some implementations, each "true" or "false" labels could increment a respective accumulator value for the respective label. This is particularly helpful where a plurality of image frames and LIDAR frames are being analyzed, as discussed later with reference to FIG. 13, in order to determine accuracy of the image-based following distance detection model over a period of time.

The labels as applied in acts 622 and 624 can be output by a device which performs method 600. For example, operator device 400 could output the labels in alerts (e.g. via display 422 or other output device such as an audio device). Some exemplary alerts are illustrated in FIG. 12. In particular, FIG. 12 shows alert 1202 indicating that validation of the image frame is false (thus informing an operator that the following distance detection model is not sufficiently accurate, at least for the image frame in question). FIG. 12 also shows alert 1204 indicating that validation of the image frame is true (thus informing an operator that the following distance detection model is sufficiently accurate, at least for the image frame in question). Based on the presented alerts, the operator can take action (e.g. taking steps to improve the following distance detection model or data collection by the image capture device.

The labels as applied in acts 622 and 624 can be output via transmission to another device. For example, if method 600 up to acts 622 and 624 is performed by any of the devices at the vehicle, or by server 520, the labels can be transmitted via at least one communication interface to operator device 400 (e.g. via communication pathway 593 or 595).

As mentioned earlier, acts of method 600 can be performed at least partially by processors at the vehicle (e.g. in image capture device 122, LIDAR unit 124, or telematics device 126) or remote from the vehicle (e.g. in cloud 510, server 500, or operator device 400). In some implementations, all of acts 606, 608, 610, 612, 614, 616, 618, 620, 622, and 624 can be performed by a single processor (or group of processor) at a single device (whether that single device is at the vehicle or remote from the vehicle). In other implementations, acts of method 600 can be performed by respective processors at respective devices at the vehicle and remote from the vehicle. As one particular example, a first processor can be positioned at the vehicle (e.g. in any of image capture device 122, LIDAR unit 124, or telematics device 126) and can perform acts 606, 608, and 610 of method 600. In this sense, the first processor takes sensor data from an image capture device and LIDAR unit, correlates frames thereof, and performs preliminary calibrations of the data. The resulting data can then be transmitted from the device at the vehicle to a remote device (such as a device in cloud 510, server 520, or operator device 400) which includes a second processor. The second processor can then perform acts 612, 614, 616, 618, 620, 622, and 624, and thus performs the comparison between the image-based distance and the LIDAR-based distance.

As mentioned earlier, acts of method 600 can be reordered as appropriate. In some implementations, any of acts 608, 610, and/or 612 could be performed before act 606. In such implementations acts 608, 610, and/or 612 can be performed generally on at least a subset of the LIDAR data accessed at 604, where the subset includes the LIDAR frame (later) correlated to the timestamp of the image frame at 606. Such an implementation is practical in a case where method 600 is performed a plurality of times, for a plurality of LIDAR frames. In such a case, the LIDAR data can be prepared (via acts 608, 610, and/or 612) before specific LIDAR frames are correlated to image frames, since the prepared LIDAR data is more likely to be correlated to at least one image frame. An implementation for analyzing multiple frames is discussed below with reference to FIG. 13.

FIG. 13 is a flowchart diagram which illustrates an exemplary method 1300 for determining accuracy of an image-based following distance determination model. Method 1300 as illustrated includes acts 1302, 1306, 1308, 1310, and 1312. One skilled in the art will appreciate that additional acts could be added, acts could be removed, or acts could be reordered as appropriate for a given application. With reference to the examples illustrated in FIGS. 1, 2A, 2B, 3, 4, and 5 acts can be performed by appropriate components of the discussed systems or devices. For example, method 1300 can be performed at an image capture device such as image capture device 200A discussed with reference to FIG. 2A, and/or a peripheral device such as peripheral device 220 discussed with reference to FIG. 2B. Method 1300 could also be performed at a LIDAR unit, such as LIDAR unit 300 discussed with reference to FIG. 3. As another example, method 1300 can be performed at a device remote from a vehicle, such as operator device 400 or server 510 discussed with reference to FIGS. 4 and 5. As another example, method 1300 can be performed jointly between a device at the vehicle and a device remote from the vehicle, similarly to as discussed above regarding method 600. Method 1300 can be implemented in a system, where at least one processor-readable storage medium stores processor executable instructions which, when executed by at least one processor, cause the system to perform the acts of method 1300.

Reference to "at least one processor" or "a processor" performing acts of any of the methods herein can refer to any appropriate processor. Further, at least one non-transitory processor-readable storage medium can store processor-executable instructions, which when executed by a respective at least one processor cause the corresponding system or device to perform a given act of any of the methods discussed herein.

Method 1300 builds on method 600. In particular, at 1302 method 600 is performed for each image frame and correlated LIDAR frame. In some implementations, this could entail individually carrying out each act of method 600 for each image frame and correlated LIDAR frame (e.g. perform method 600 from start to finish for an image frame and correlated LIDAR frame, then perform method 600 from start to finish for another image frame and another correlated LIDAR frame). In other implementations however, at least some acts of method 600 can be performed together for each image frame and correlated LIDAR frame. Examples are discussed below.

Act 602 can be performed for several image frames captured by at least one image sensor, such as a video file, or select images from a video file (e.g. every tenth image frame of the video file, or any other appropriate interval). In particular, the image-based following distance determination model can be executed to analyze each image frame, and generate a plurality of image-based distance values, one respective value for each image frame. In this example performing act 602 for each image frame comprises accessing the plurality of image-based distance values.

Act 604 can be performed for several LIDAR frames together. In particular, accessing the LIDAR data for the second vehicle can comprise accessing the LIDAR data which spans a period of time (and thus several LIDAR frames).

Act 606 can be performed for each of the image frames together. In particular, each image frame can be correlated (based on its timestamp) to a respective nearest LIDAR frame from the LIDAR data.

Acts 608, 610, and/or 612 can (optionally) be performed together for each of the LIDAR frames (at least the LIDAR frames which are correlated to respective image frames), to calibrate and prepare the LIDAR frames for subsequent analysis.

At 614, the clustering algorithm can be applied to each LIDAR frame to identify a respective cluster of LIDAR data points representing the first vehicle in each LIDAR frame.

At 616, the at least one processor can identify a respective LIDAR-based distance between the second vehicle and the respective cluster of LIDAR data points for each LIDAR frame.

For 618, the at least one processor can determine a respective difference between the respective LIDAR-based distance and the respective image-based distance value for each LIDAR frame and correlated image frame.

For 620, 622, and 624, the determination and labelling is performed for each LIDAR frame and correlated image frame. If the respective difference between the respective LIDAR-based distance and the respective image-based distance value is within the threshold ratio of the respective LIDAR-based distance, at 622 the respective image-based distance value is labelled as true. If the respective difference between the respective LIDAR-based distance and the respective image-based distance value exceeds the threshold ratio of the respective LIDAR-based distance, at 624 the respective image-based distance value is labelled as false.

Returning to FIG. 13, output 1304 is shown, which arises from act 1302. Output 1304 includes a set of labelled image-based distance values for respective image frames of the plurality of image frames (e.g. the labels can be included as metadata with the image frames, as an additional file to the image data, or could be stored as numbers of true/false labels in respective incremented accumulators for these labels as discussed earlier). Output 1304 does not necessarily require the image data for the image frames itself; rather output 1304 is used in subsequent acts to verify efficacy of the following distance detection model, and is not reliant on the image frames itself beyond application of the following distance detection model prior to act 602 in method 600. Output 1304 could for example be transmitted or stored by a device which performs act 1302.

At 1306, the at least one processor determines image-based distance value accuracy for the plurality of image frames. This is determined as a proportion of image frames where respective image-based distance values are labelled as true. This is shown in Equation (5) below:

$$\text{Accuracy} = \frac{f\#(\text{true})}{f\#(\text{total})} * 100\% \tag{5}$$

In Equation (5), Accuracy (expressed as a percentage) refers to the image-based distance value accuracy, f#(true) refers to the number of image frames labelled as true (where the Error Rate is less than the Error Margin) or not labelled as false if only the false label is used as discussed earlier, and f#(total) refers to the total number of frames.

At 1308, the at least one processor compares the Accuracy to a satisfaction threshold. If Accuracy exceeds the satisfaction threshold, method 1300 proceeds to 1310 where a success notification is output. If Accuracy does not meet the satisfaction threshold, method 1300 proceeds to 1312 where a failure notification is output.

In an example, the satisfaction threshold is 100%. This does not mean that the distance as determined by the image-based following distance model always matches the LIDAR-based distance; rather this means that the image-based following distance model always determines an image-based distance which is satisfactorily close to the LIDAR-based distance (Error Rate is within the Error Margin discussed with reference to act 620 in method 600, and expressed in Equations 2, 3, and 4). Other satisfaction thresholds could be applied as appropriate for a given application.

The outputs at 1310 and 1312 can be output by a device which performs method 1300. For example, operator device 400 could output the determinations in alerts (e.g. via display 422 or other output device such as an audio device). Some exemplary alerts are illustrated in FIG. 14. In particular, FIG. 14 shows alert 1402 indicating that the following distance detection model has failed accuracy tests (thus informing an operator that the image-based following distance detection model is not sufficiently accurate). FIG. 14 also shows alert 1404 indicating that the following distance detection model has passed accuracy tests (thus informing an operator that the image-based following distance detection model is sufficiently accurate). Based on the presented alerts, the operator can take action (e.g. taking steps to improve the following distance detection model or data collection by the image capture device.

As mentioned earlier, acts of method 600 and 1300 can be performed at least partially by processors at the vehicle (e.g. in image capture device 122, LIDAR unit 124, or telematics device 126) or remote from the vehicle (e.g. in cloud 510, server 500, or operator device 400). In some implementations, all of acts 606, 608, 610, 612, 614, 616, 618, 620, 622, and 624 (within the context of act 1302), and acts 1306, 1308, 1310, and 1312 can be performed by a single processor (or group of processor) at a single device (whether that single device is at the vehicle or remote from the vehicle). In other implementations, acts of method 600 (within the context of act 1302) and acts of method 1300 can be performed by respective processors at respective devices at the vehicle and remote from the vehicle. As one particular example, a first processor can be positioned at the vehicle (e.g. in any of image capture device 122, LIDAR unit 124, or telematics device 126) and can perform acts 606, 608, and 610 of method 600. In this sense, the first processor takes sensor data from an image capture device and LIDAR unit, correlates frames thereof, and performs preliminary calibrations of the data. The resulting data can then be transmitted from the device at the vehicle to a remote device (such as a device in cloud 510, server 520, or operator device 400) which includes a second processor. The second processor can then perform acts 612, 614, 616, 618, 620, 622, 624, 1306, 1308, 1310, and 1312 and thus performs the comparison between the image-based distance and the LIDAR-based distance for the plurality of image frames and LIDAR frames.

FIG. 15 is a flowchart diagram which illustrates an exemplary method 1500 for determining image-based following distance values (e.g. as accessed at 602 in method 600). Method 1500 can be applied to real-world images (images captured by an image sensor) to detect real-world following distance. Further, method 1500 can also be applied to simulated images (images generated by simulation), for the purposes of testing, validation, training of other models, or any other appropriate applications. Method 1500 as illustrated includes acts 1502, 1504, 1506, and 1508. One skilled in the art will appreciate that additional acts could be added, acts could be removed, or acts could be reordered as appropriate for a given application. Acts of method 1500 can be performed by appropriate components of the systems or devices discussed earlier, such as image capture devices 122, 200A, or peripheral device 220; LIDAR units 124 or 300; operator device 400; or server 520. A system or device which performs method 1500 is not necessarily the same hardware which generates training data or the same hardware which trains the model. In this way, training data generation, model training, and model execution can be performed by discrete systems or devices most suited to the task. For example, a central server can perform training data generation and model training, and a device at a vehicle (e.g. image capture device 200A or peripheral device 220) can apply the model based on image data captured at the vehicle. However, in some implementations, a single device or system can perform all of generating training data, training a machine learning model, and applying the machine learning model.

Method 1500 is discussed below in the context of an example scenario illustrated in FIG. 16. However, method 1500 is applicable to many different scenarios. FIG. 16 illustrates an image 1600 having a boundary 1610, a height $k_1$, and a width $k_2$. Image 1600 shows a vehicle 1620 (the first vehicle in method 1500) driving along a roadway 1602 shown by edges 1604 and 1606, towards a horizon 1608. A vehicle (the second vehicle in method 1500) is driving behind vehicle 1620, and carries the image capture device which the perspective of image 1600 represents (i.e., the camera which captures image 1600). Vehicle 1620 in FIG. 16 can be the first vehicle 110 in FIG. 1; the vehicle carrying the image capture device which captures image 1600 can be the second vehicle 120 in FIG. 1.

Returning to method 1500, at 1502, an image is accessed including a representation of a first vehicle from a perspective of a second vehicle behind the first vehicle. In the example of FIG. 16, the accessed image is image 1600. In some implementations, accessing the image comprises capturing the image, by at least one image capture device positioned at the second vehicle. In other implementations, accessing the image comprises receiving the image by a device or system performing method 1500 (e.g., a server which performs method 1500 can receive the image as transmitted from an image capture device at a vehicle which captured the image). In yet other implementations, accessing the image comprises accessing the image as stored in at least one non-transitory processor-readable storage medium (e.g., the image is previously captured by an image capture device, and stored at a non-transitory processor-readable storage medium at a vehicle or at a server for later retrieval when performing method 1500).

At 1504, at least one processor of the system or device performing method 1500 determines at least one image attribute based on a positional measure between the first vehicle as represented in the image and at least one boundary of the image. Such a positional measure can be based on physical features of the vehicle represented in the image (e.g. pixels of the image representing edge features of the vehicle), or by identifying delineations of the vehicle. For example, a feature detection model (such as the YOLO detection model) can be run on the image, to identify the first vehicle in the image. A bounding box (such as bounding box 1622 in image 1600 shown in FIG. 16) can be identified which approximates boundaries of the first vehicle (vehicle 1620) in the image. The at least one positional measure can be based on such a bounding box, as discussed in several examples herein.

In some exemplary implementations, a feature detection model can be applied to identify road lanes. Once lanes are identified, the at least one processor determines a lane of travel of the vehicle carrying the image capture device. Vehicles travelling in the same lane as the vehicle with the image capture device are considered to be "in front" of the second vehicle in the context of determining following distance in method 1500. Such lane analysis or similar determinations are not necessarily included in method 1500, however. In other implementations, such lane determination could happen in the context of a larger method instead.

In the example of FIG. 16, the positional measure includes a distance $H_1$ from a bottom boundary of the image 1600 (e.g. a bottom edge of boundary 1610) to a bottom of the first vehicle 1620 (or a bottom of the bounding box 1622) in the image 1600. Distance $H_1$ represents a distance along the image, and can be expressed in any appropriate units. A particularly convenient unit is number of pixels, such that distance $H_1$ represents a number of pixels from a bottom edge of image 1600 to a bottom of vehicle 1620 (or bottom of bounding box 1622). In some implementations, $H_1$ can be normalized by dividing by image size (e.g. $H_1/k_1k_2$). Such a normalized measure can be included in the at least one image attribute, and produces similar results regardless of image size. In this way, the measure can be applied to different sizes of images (e.g. from different image capture devices, or preprocessed/cropped in different ways), and still produce predictable results.

Optionally, in the example of FIG. 16, the positional measure can also include another distance $H_2$ from a top boundary of the image 1600 to a top of the first vehicle 1620 (or a top of the bounding box 1622) in the image 1600.

At 1506 in method 1500, the at least one processor applies a following distance determination model to determine the following distance based on the at least one image attribute determined at 1504. This model is a machine learning model trained to predict or determine following distance based on the at least one image attribute, as opposed to by analysis of the image itself.

Generally, the further a leading vehicle is from a tailgating vehicle (the greater the physical distance between the first and second vehicle in method 1500), the larger distance $H_1$ will be, and the smaller the distance $H_2$ will be. This is because a further away vehicle will typically appear higher up in images captured by a front-facing camera in a vehicle. As such, in the example of FIG. 16, the model will generally determine following distance as proportional to distance $H_1$ (and optionally inversely proportional to distance $H_2$).

At 1508, the determined image-based distance value is output. In an exemplary implementation where method 1500 is used to determine image-based distance value prior to act 602 of method 600, outputting the image-based distance value can include preparing the image-based distance value for method 600 (e.g. by storing the determined image-based distance value in at least one non-transitory processor-readable storage medium).

In implementations where a plurality of image frames are analyzed (e.g. in method 1300 in FIG. 13), image-based distance value can be determined for each image frame by applying method 1500 to the image frame.

FIGS. 15 and 16 illustrate one exemplary image-based distance detection model. Any other appropriate image-based distance detection model could be utilized as appropriate for a given application. In this regard, U.S. Provisional Patent Application Nos. 63/456,179, 63/526,233, 63/537,875, 63/606,307 and U.S. Non-Provisional patents application Ser. Nos. 18/133,714, 18/133,752, 18/133,797, 18/133,835, 18/224,208, 18/224,360, 18/620,408, 18/620, 486, 18/620,520, 18/808,429 describe several such image-based detection models, as well as training data and training methods therefore; all of these documents are incorporated in their entirety by reference herein.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device generally refers to the data information being stored at a non-transitory processor-readable storage medium of said device.

What is claimed is:
1. A system comprising:
at least one processor;

at least one non-transitory processor-readable storage medium storing processor executable instructions which, when executed by the at least one processor, cause the system to:

access an image-based distance value corresponding to an image frame, the image-based distance value indicating a following distance between a first vehicle and a second vehicle, as output by an image-based distance determination model which analyzes the image frame as captured by an image capture device positioned at the second vehicle;

access LIDAR data captured by a LIDAR sensor positioned at the second vehicle;

correlate, by the at least one processor, data for a LIDAR frame of the LIDAR data to a timestamp of the image frame;

apply, by the at least one processor, a clustering algorithm to the LIDAR frame to identify a cluster of LIDAR data points representing the first vehicle;

determine, by the at least one processor, a LIDAR-based distance between the second vehicle and the cluster of LIDAR data points;

determine, by the at least one processor, a difference between the LIDAR-based distance and the image-based distance value;

if the difference between the LIDAR-based distance and the image-based distance value is within a threshold ratio of the LIDAR-based distance, label the image-based distance value as true; and if the difference between the LIDAR-based distance and the image-based distance value exceeds the threshold ratio of the LIDAR-based distance, label the image-based distance value as false.

2. The system of claim 1, wherein the processor-executable instructions which cause the system to correlate the LIDAR frame to the timestamp of the image frame cause the at least one processor to:

synchronize the LIDAR data to a server clock to which the image frame is synchronized; and selecting the LIDAR frame from a plurality LIDAR frames data, based on the LIDAR frame having a timestamp which is closest to a timestamp of the image frame.

3. The system of claim 1, wherein the processor-executable instructions further cause the at least one processor to:

execute a ground surface identification model on the LIDAR frame to identify a ground surface plane; and calibrate the LIDAR frame to compensate for a non-zero angle between the LIDAR sensor and the ground surface plane.

4. The system of claim 1, wherein the processor-executable instructions further cause the at least one processor to:

identify a region of interest in the LIDAR frame positioned in front of the second vehicle.

5. The system of claim 4, wherein the processor executable instructions which cause the at least one processor to identify the region of interest cause the at least one processor to:

identify a lane of travel of the second vehicle based on the LIDAR frame; and identify the region of interest as being limited to the lane of travel.

6. The system of claim 5, wherein the processor-executable instructions which cause the at least one processor to identify the lane of travel of the second vehicle cause the at least one processor to identify lane markings represented in the LIDAR frame which delineate the lane of travel in which the second vehicle is positioned.

7. The system of claim 1, wherein the processor-executable instructions which cause the at least one processor to determine LIDAR-based distance between the second vehicle and the cluster of LIDAR data points cause the at least one processor to identify the LIDAR based distance as a distance between the second vehicle and a data point in the cluster of LIDAR data points which is closest to the second vehicle.

8. The system of claim 1, wherein the processor-executable instructions which cause the at least one processor to determine the LIDAR-based distance between the second vehicle and the cluster of LIDAR data points cause the at least one processor to determine the LIDAR-based distance as a distance between the second vehicle and an average or median position of the cluster of LIDAR data points.

9. The system of claim 1, wherein:
the processor-executable instructions which cause the system to access an image-based distance value corresponding to an image frame cause the system to:
access, a plurality of image-based distance values, each image-based distance value indicating a respective following distance between a first vehicle and a second vehicle, as output by the image-based distance determination model which analyzes a respective image frame as captured by an image sensor positioned at the second vehicle;
the processor-executable instructions which cause the at least one processor to correlate a LIDAR frame of the LIDAR data to a timestamp of the image frame cause the at least one processor to:
correlate a respective frame of a plurality of frames of the LIDAR data to respective timestamps of the plurality of image frames;
the processor-executable instructions which cause the at least one processor to apply a clustering algorithm to the LIDAR frame to identify a cluster of LIDAR data points representing the first vehicle cause the at least one processor to:
apply the clustering algorithm to each LIDAR frame to identify a respective cluster of LIDAR data points representing the first vehicle for each LIDAR frame;
the processor-executable instructions which cause the at least one processor to identify a LIDAR-based distance between the second vehicle and the cluster of LIDAR data points cause the at least one processor to:
identify a respective LIDAR-based distance between the second vehicle and the respective cluster of LIDAR data points for each LIDAR frame; and
the processor-executable instructions which cause the at least one processor to determine a difference between the LIDAR-based distance and the image-based distance value cause the at least one processor to:
determine a respective difference between the LIDAR-based distance and the respective image-based distance value for each LIDAR frame.

10. The system of claim 9, wherein;
the processor-executable instructions which cause the at least one processor to, if the difference between the LIDAR-based distance and the image-based distance value is within a threshold ratio of the LIDAR-based distance, label the image-based distance value as true, cause the at least one processor to, for each LIDAR frame: if the respective difference between the respective LIDAR-based distance and the respective image-based distance value is within a threshold ratio of the respective LIDAR-based distance, label the respective image-based distance value as true; and
the processor-executable instructions which cause the at least one processor to, if the difference between the LIDAR-based distance and the image-based distance value exceeds the threshold ratio of the LIDAR-based distance, label the image-based distance value as false, cause the at least one processor to, if the respective difference between the respective LIDAR-based distance and the respective image-based distance value exceeds the threshold ratio of the respective LIDAR-based distance, label the respective image-based distance value as false.

11. The system of claim 10, wherein the processor-executable instructions further cause the at least one processor to:
determine image-based distance value accuracy for the plurality of image frames as a percentage of image frames of the plurality of image frames where the respective image-based distance value is labelled as true.

12. The system of claim 1, further comprising the LIDAR sensor, wherein the processor-executable instructions which cause the system to access the LIDAR data cause the LIDAR sensor to capture the LIDAR data.

13. The system of claim 1, wherein the processor-executable instructions further cause the system to:
execute the image-based distance determination model on image data captured by the image capture device to generate the image-based distance value.

14. The system of claim 13, further comprising the image capture device, wherein the processor-executable instructions further cause the system to: capture, by the image capture device, the image data.

15. The system of claim 1, wherein:
the at least one processor includes a first processor positioned at the second vehicle and a second processor remote from the second vehicle;
the processor executable instructions which cause the at least one processor to correlate data for the LIDAR frame to the timestamp of the image frame cause the first processor to correlate the data for the LIDAR frame to the timestamp of the image frame; and
the processor executable instructions which cause the at least one processor to apply the clustering algorithm, to determine the LIDAR-based distance, and to determine the difference between the LIDAR-based distance and the image-based distance value cause the second processor to apply the clustering algorithm, to determine the LIDAR-based distance, and to determine the difference between the LIDAR-based distance and the image-based distance value.

\* \* \* \* \*